(12) United States Patent
Schroeter et al.

(10) Patent No.: US 12,437,415 B2
(45) Date of Patent: Oct. 7, 2025

(54) METHODS AND SYSTEMS FOR NON-DESTRUCTIVE EVALUATION OF STATOR INSULATION CONDITION

(71) Applicant: Ford Global Technologies, LLC, Dearborn, MI (US)

(72) Inventors: Robert Schroeter, Livonia, MI (US); Jackson Lenz, Southfield, MI (US); Boratha Tan, Detroit, MI (US); Ife Siffre, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 17/937,644

(22) Filed: Oct. 3, 2022

(65) Prior Publication Data

US 2024/0112350 A1    Apr. 4, 2024

(51) Int. Cl.
| | | |
|---|---|---|
| G06T 7/174 | (2017.01) | |
| G06T 7/38 | (2017.01) | |
| G06V 10/26 | (2022.01) | |

(52) U.S. Cl.
CPC ............... *G06T 7/174* (2017.01); *G06T 7/38* (2017.01); *G06V 10/26* (2022.01); *G06T 2207/10064* (2013.01)

(58) Field of Classification Search
CPC . G06T 7/174; G06T 7/38; G06T 2207/10064; G06T 2207/10024; G06T 2207/20081; G06T 2207/20084; G06T 2207/30164; G06T 7/0004; G06V 10/26
See application file for complete search history.

(56) References Cited

U.S. PATENT DOCUMENTS

| | | | | |
|---|---|---|---|---|
| 8,275,558 | B2* | 9/2012 | Reed | A23B 11/22 |
| | | | | 702/34 |
| 9,162,513 | B2* | 10/2015 | Pawlik | B42D 25/30 |
| 9,349,087 | B2* | 5/2016 | Cleary | G06K 19/06056 |
| 10,059,061 | B2* | 8/2018 | Burns | G05B 19/182 |
| 10,193,695 | B1* | 1/2019 | Endress | H04L 9/0637 |
| 2009/0104373 | A1* | 4/2009 | Vanbesien | B41M 7/02 |
| | | | | 427/157 |
| 2017/0084358 | A1* | 3/2017 | Osterloh | G01N 23/203 |
| 2017/0277979 | A1* | 9/2017 | Allen | G06F 18/2411 |
| 2018/0342069 | A1* | 11/2018 | Lim | G06T 7/0008 |

(Continued)

FOREIGN PATENT DOCUMENTS

| | | | | |
|---|---|---|---|---|
| CA | 2796489 A1 * | 5/2014 | ......... | G01N 21/6408 |
| EP | 3527974 A1 * | 8/2019 | ........... | F01D 21/003 |
| EP | 3971904 A1 * | 3/2022 | ............ | B25J 9/1697 |

*Primary Examiner* — Molly Wilburn
*Assistant Examiner* — Jordan McKenzie Elliott
(74) *Attorney, Agent, or Firm* — David Kelley; McCoy Russell LLP

(57) ABSTRACT

Methods and systems are provided for an insulation system of a stator. In one example, a method may include receiving images of the stator at an automated tool implemented at a processor of a computing system, the images depicting slots in in an inner surface of the stator, and processing the images using image processing and deep learning algorithms to provide processed images. The processed images may be input to an artificial intelligence (AI) model of the automated tool, the AI model trained to identify varnish in the processed images. obtained two-dimensional presentation of varnish distribution may be output from the AI model.

10 Claims, 25 Drawing Sheets

(56) References Cited

U.S. PATENT DOCUMENTS

| | | | |
|---|---|---|---|
| 2021/0209752 A1* | 7/2021 | Tenney | G06T 7/30 |
| 2021/0374925 A1* | 12/2021 | Finlayson | G06V 10/803 |
| 2022/0276235 A1* | 9/2022 | Chou | G01N 33/54313 |
| 2022/0318986 A1* | 10/2022 | Brauer | G06V 10/7747 |
| 2022/0409057 A1* | 12/2022 | Valbusa | G06V 10/28 |

* cited by examiner

| Inside Paper | Slot # | Surface Area (mm²) | Varnish Area (mm²) | Percent Fill |
|---|---|---|---|---|
| Twist | 2 | 8.35 | 7.09 | 84.9 |
| | 18 | 8.35 | 7.55 | 90.4 |
| | 33 | 8.35 | 8.05 | 96.4 |
| Crown | 2 | 8.35 | 8.15 | 97.6 |
| | 18 | 8.35 | 7.35 | 88.0 |
| | 33 | 8.35 | 8.10 | 97.0 |
| Center | 2 | 8.35 | 7.27 | 87.1 |
| | 18 | 8.35 | 6.94 | 83.2 |
| | 33 | 8.35 | 7.43 | 89.0 |
| Average | | 8.35 | 7.55 | 90.4 |
| Min | | 8.35 | 6.94 | 83.2 |
| Max | | 8.35 | 8.15 | 97.6 |

FIG. 10

METHODS AND SYSTEMS FOR NON-DESTRUCTIVE EVALUATION OF STATOR INSULATION CONDITION

FIELD

The present description relates generally to methods and systems for evaluating a condition of a stator insulation system.

BACKGROUND/SUMMARY

Electric traction motors, e.g., electric motors or electric machines, may be used to enable vehicle propulsion. In some examples, electric motors may also be operated to regenerate energy, thereby enabling recharging of energy storage devices and reducing fuel consumption in, for example, hybrid electric vehicles. An electromagnetic circuit of an electric traction motor may include a stator which is a stationary component of the circuit configured to interact with a rotor to drive motion of the rotor. For example, the stator core may support conductive windings which generate a rotating magnetic field that causes the rotor to rotate within the stator.

The conductive windings may be coupled to the stator by threading of the windings through slots formed along an inner surface of the stator. To mitigate electrical shorting and degradation of the windings resulting from exposure to moisture and vibrations, and to encapsulate and immobilize end turns of the windings, the stator may be configured with an insulation system that insulates the windings. The insulation system may include a heat tolerant, electrically isolating material applied to the windings as a coating within the slots. The coating may be a varnish formed of a resin such as an epoxy or an alkyd that is applied during manufacturing of the stator.

Various methods for applying the varnish are possible, including dipping the windings in varnish and curing in an oven, trickle varnishing, vacuum pressure impregnation, etc. A condition of the resulting varnish coating the windings within the slots, e.g., a thickness, continuity, and uniformity, may affect a performance and useful life of the stator. Evaluation of the condition of the varnish coating after application may therefore be desirable for manufacturing quality control but efficient assessment of the condition of the varnish coating may be challenging due to a location of the varnish coating within the slots of the stator. Conventional methods for testing winding insulation, such as insulation resistance tests, may confirm that the coating is continuous but does not provide information regarding thickness and uniformity. In order to reliably verify the varnish coating condition, destructive techniques may be demanded, such as cutting a sacrificial stator into pieces to visually examine the varnish coating within the stator's inner surfaces. Such verification protocols may be costly, time consuming, and prone to wide variations in accuracy. A more efficient, robust method for analyzing varnish coating of windings within the stator slots is therefore desirable.

In one example, the issues described above may be addressed by a method for automatically analyzing images of a stator, including receiving the images of the stator at an automated tool implemented at a processor of a computing system, the images depicting slots in an inner surface of the stator, and processing the images using image processing and deep learning algorithms by segmenting and aligning the images to generate processed images. The processed images may be input to an artificial intelligence (AI) model of the automated tool, the AI model trained to identify varnish in the processed images based on color distribution analysis. The method may further include generating predicted two-dimensional (2D) representations of varnish distribution for the slots via the AI model, and displaying the 2D representations at a display device. In this way, the varnish coating within stator slots may be evaluated while allowing the stator and the varnish coating to remain intact.

As one example, fluorescence of varnish within slots of the stator may be leveraged to estimate the condition of the varnish coating using an artificial intelligence (AI) model trained via machine learning. Fluorescence images of the stator slots may be acquired and the images may be processed to extract signatures corresponding to the varnish coating. The signatures may be input to the AI model to determine a predicted fill, e.g., of the varnish coating, of the slots. The predicted fill may be displayed as one or more of a report, a graph, and a predicted image representing varnish distribution in a slot. By utilizing imaging of an intact stator to assess the varnish coating, a non-destructive, cost-effective, and rapid technique for varnish condition verification may be provided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 10 shows an example of a report which may be output by an automated tool for estimating fill percentage from images.

DETAILED DESCRIPTION

The following description relates to systems and methods for assessing a condition of an insulation system of a stator. The insulation system may include a varnish that coats the stator windings within slots of the stator. A state of the varnish may be determined by acquiring images of the stator and processing the images using an automated tool configured with an AI model trained to estimate a fill percentage of the varnish at the stator slots, where the fill percentage represents how much of a surface of a selected slot is coated by the varnish. A process for estimating the fill percentage of varnish in a stator is depicted as a block diagram in FIG. 1. A stator may be configured with slots distributed along an inner surface of the stator, as shown in an example of the stator in FIGS. 2A-2B. A cross-sectional view of the stator is illustrated in FIG. 3A and a magnified view of a portion of the stator is shown in FIG. 3B.

Figure 4:
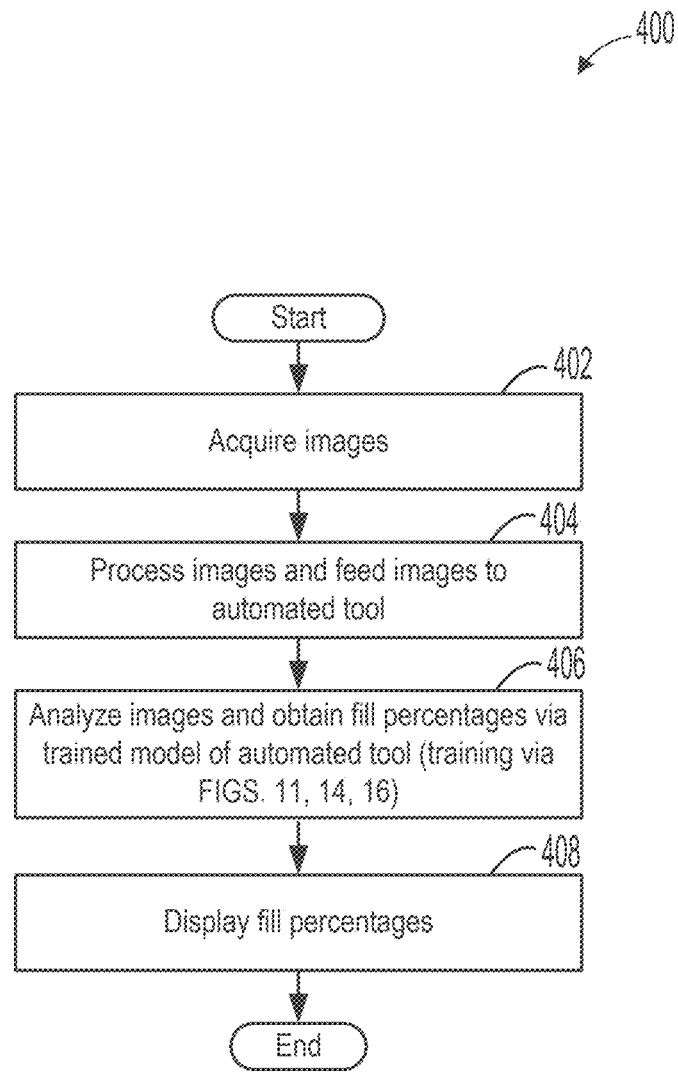
FIG. 4 shows a high level example of a process for analyzing varnish in stator section images using an automated tool implemented at a computing system.

A high level example of a method for automatically processing and analyzing the images for varnish using the automated tool is depicted in FIG. 4. The method of FIG. 4 may be applied to images of an inner surface of the stator (e.g., the intact stator), as well as to transverse and axial cross-sections of the stator, with examples of the cross-sections shown in FIGS. 5 and 6, respectively. The transverse cross-sections provide cross-sectional images of the stator windings for processing and analysis while the axial cross-sections provide views of a surface of the stator core that forms one side of a slot for processing and analysis.

Figure 7:
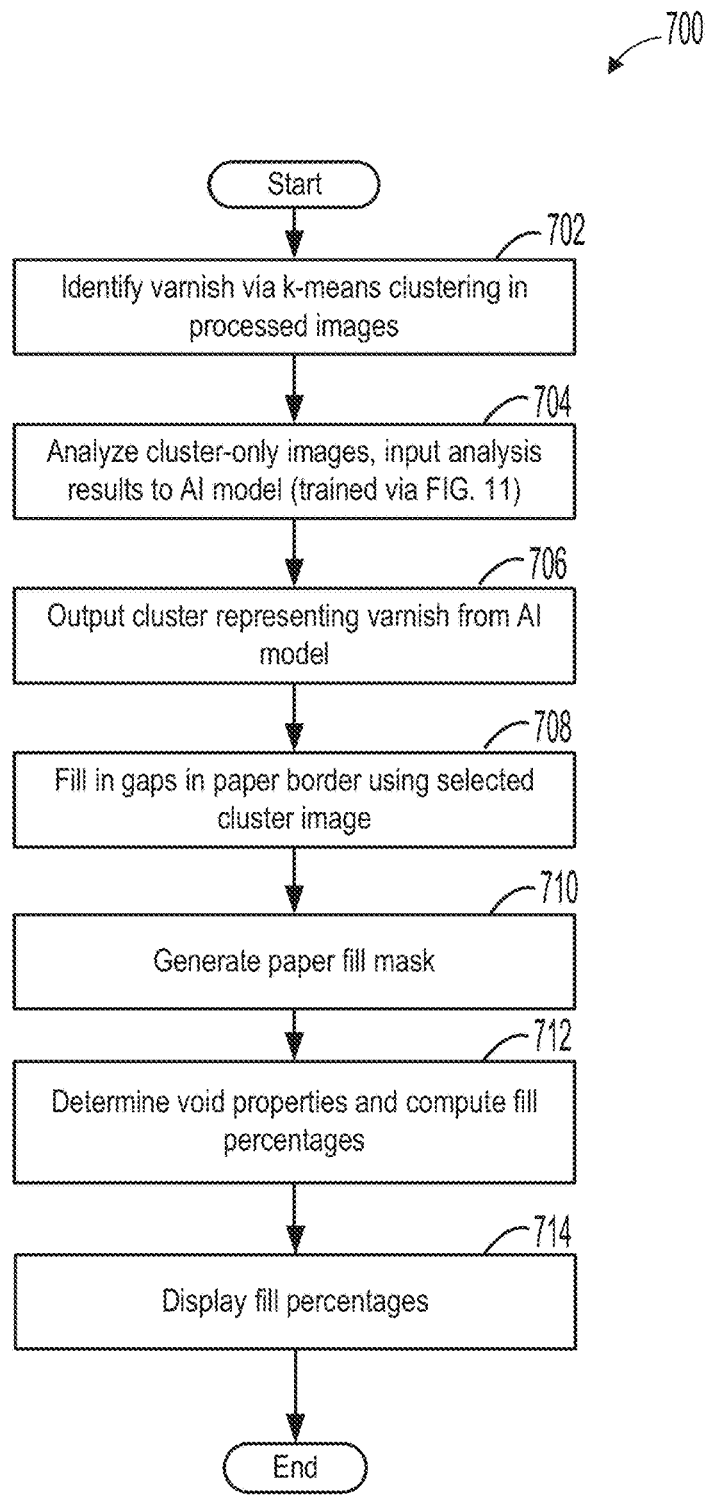
FIG. 7 shows an example of a method for processing and analyzing images using an automated tool, the automated tool including an AI model trained via a first technique.
Figure 8:
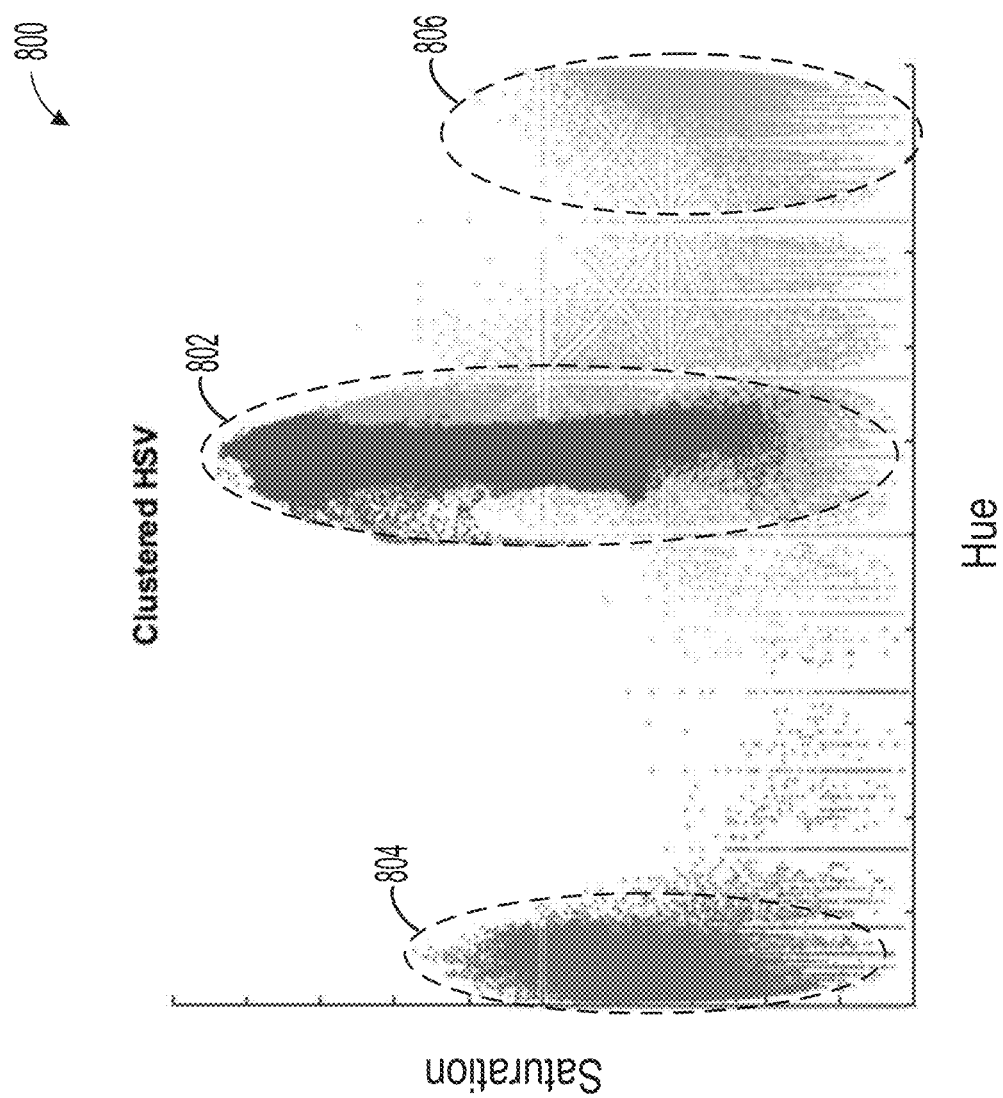
FIG. 8 shows an example of a plot of hue saturation value (HSV) color space clusters used in the first technique of FIG. 7.
Figure 9A:
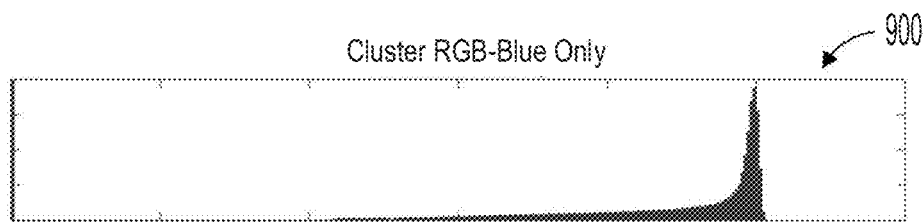
FIGS. 9A-9E shows a series of graphs plotting image parameters for the images according to the first technique of FIG. 7.
Figure 9B:
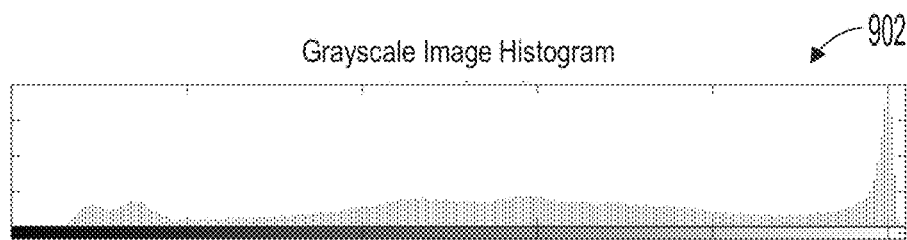
Figure 9C:
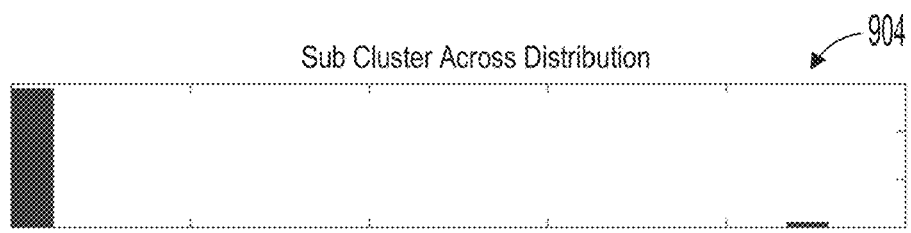
Figure 9D:
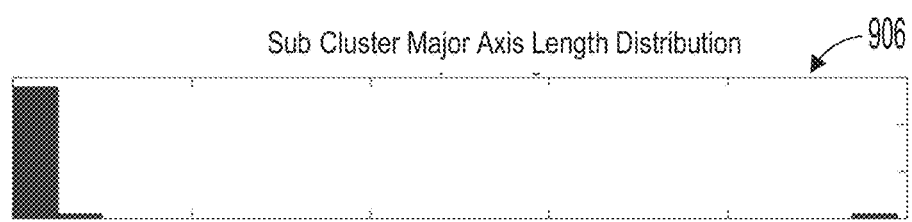
Figure 9E:
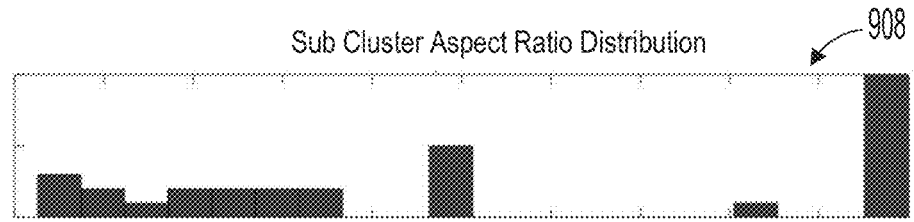
Figure 11:
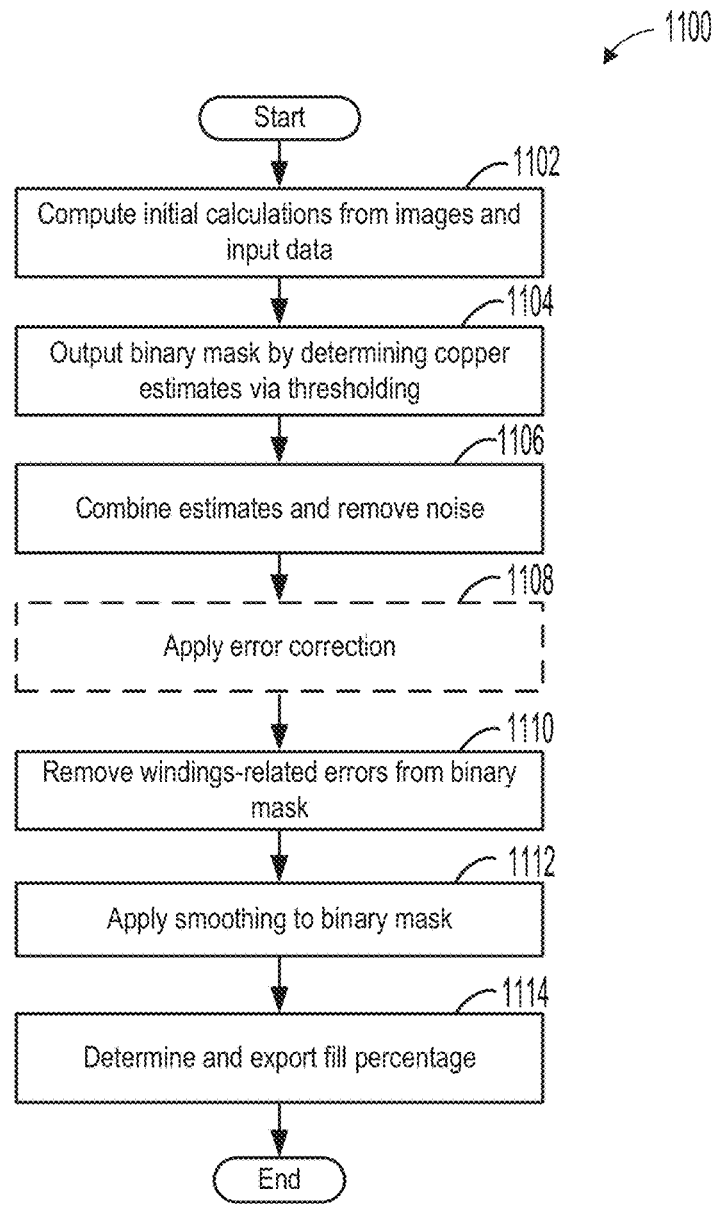
FIG. 11 shows an example of a method for training an AI model using the first technique, which may be used to analyze images processed via the method of FIG. 7.
Figure 12:
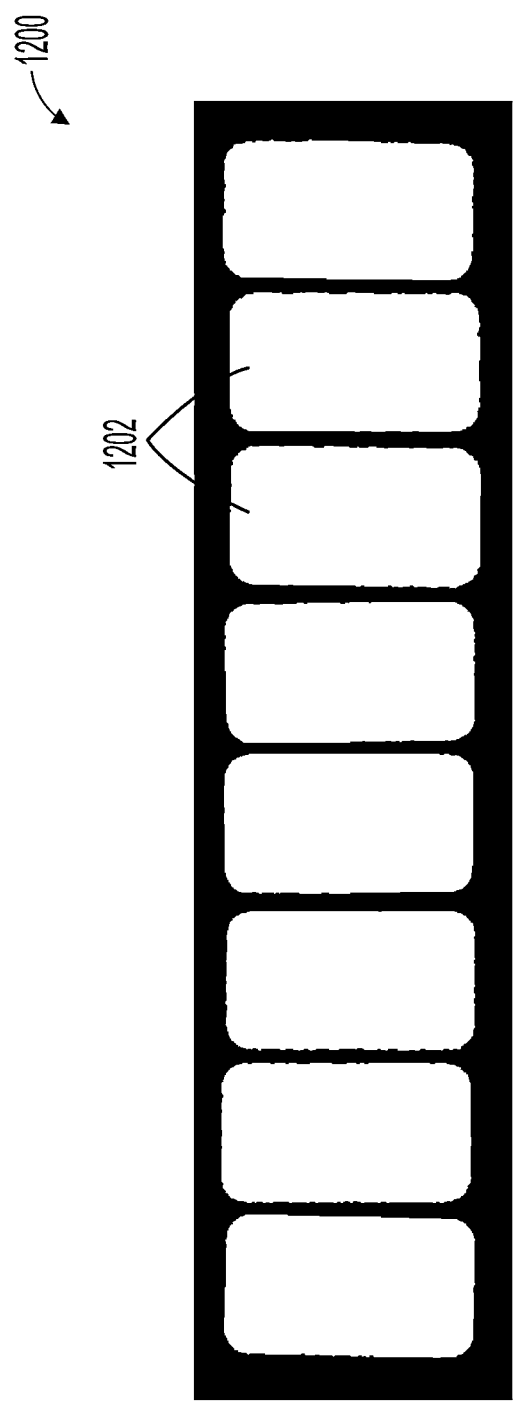
FIG. 12 shows an example of a binary mask generated by the automated tool based on the image of FIG. 5 according to the first technique of FIG. 11.
Figure 13:
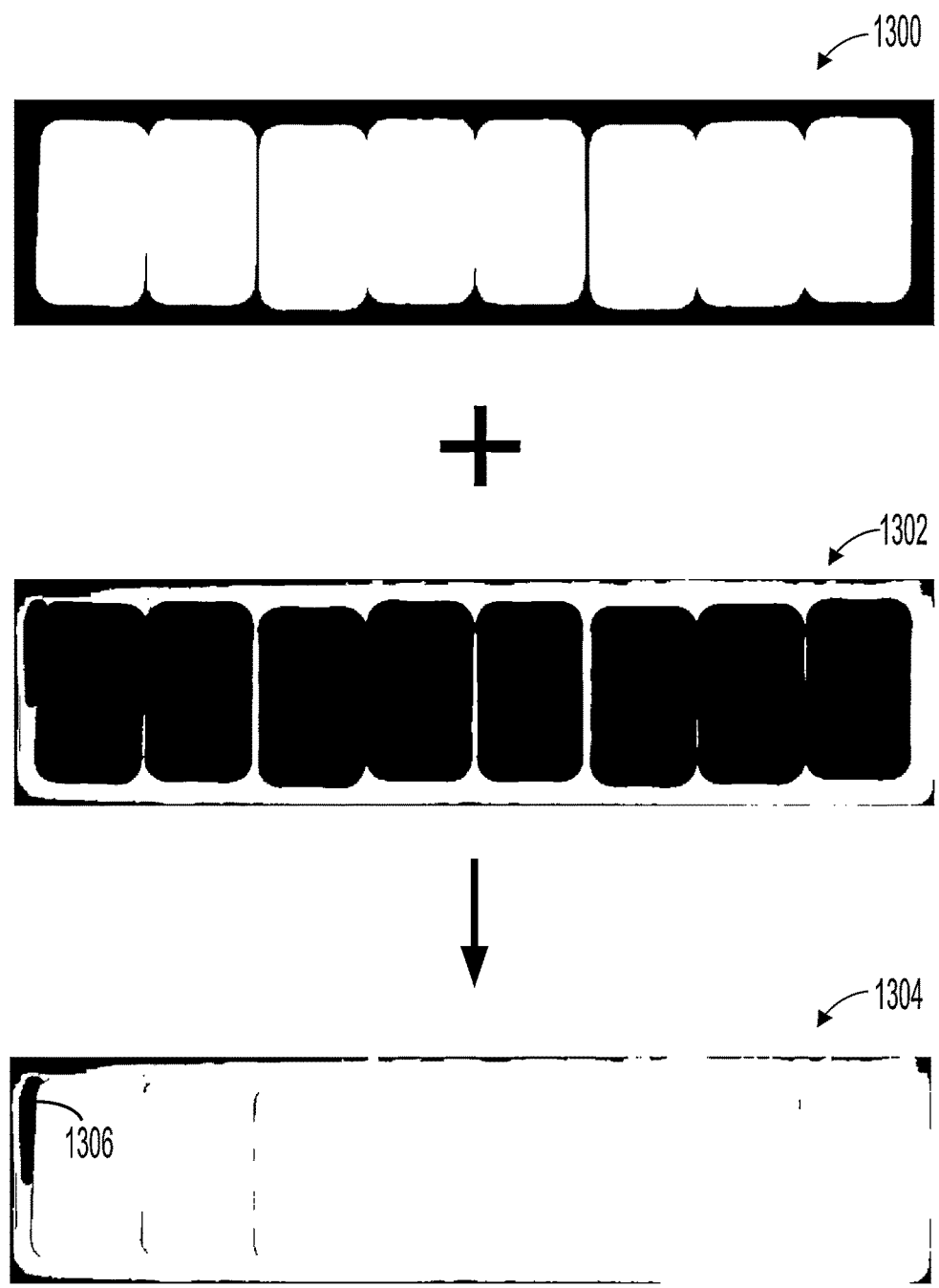
FIG. 13 shows an example of void detection from the binary mask of FIG. 12 according to the first technique of FIG. 11.

The AI model of the automated tool may be trained via one or more techniques to estimate the fill percentage based the images of the cross-sections, where the training technique may be selected based on cross-section type and accuracy. An example of a method executed by the automated tool to estimate the fill percentage in the images of the transverse cross-sections of the stator is depicted in FIG. 7, where the method may be a more detailed version of the method of FIG. 4. Exemplary data used in the method of FIG. 7 is shown in FIGS. 8-9E. The method depicted in FIG. 7 may include inputting data to the AI model to obtain estimated varnish fill percentages, where the AI model may be trained according to a first technique that relies on color distribution analysis of the images after the images are processed. An example of the first technique for training the AI model based on the images of the transverse cross-sections is shown in FIG. 11. The first technique may rely on transformation of the images into binary masks and application of an image parameter threshold for analysis of varnish and identification of voids in the varnish. Examples of image conversions generated in the second technique and used for varnish analysis are depicted in FIGS. 12-13.

Figure 14:
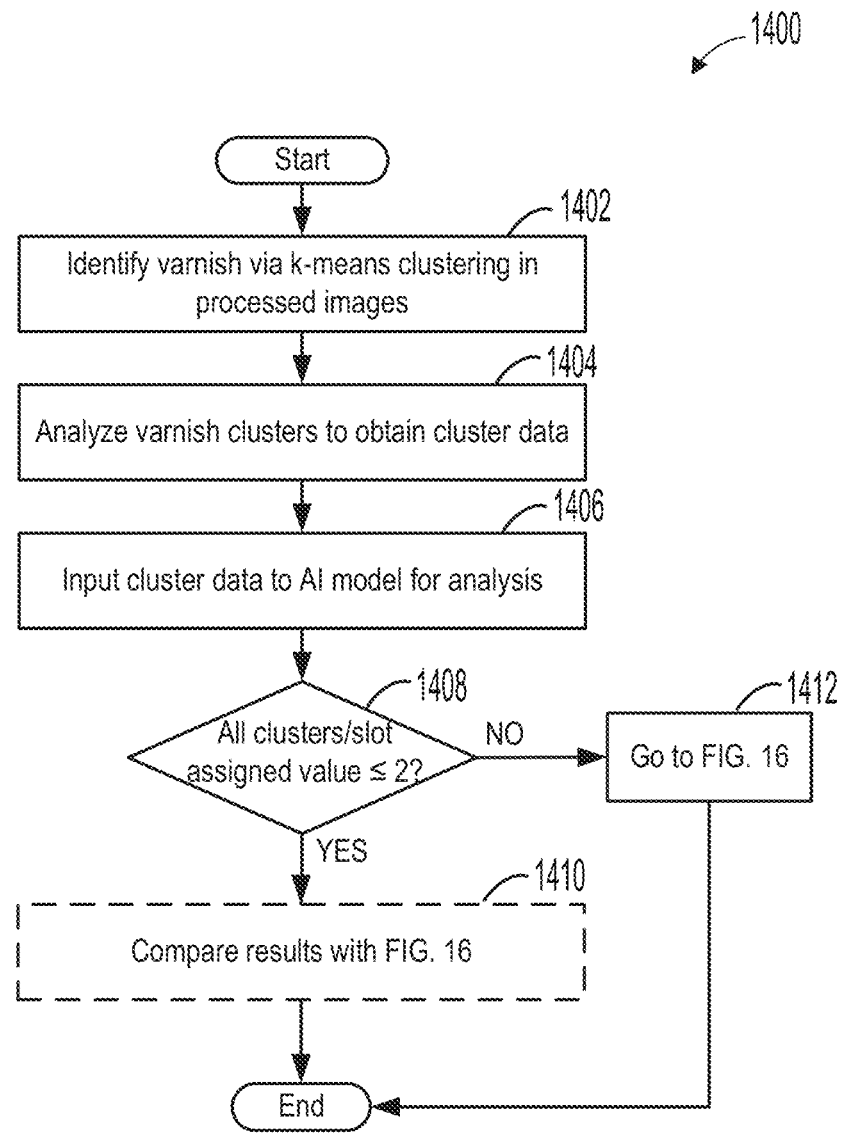
FIG. 14 shows an example of a method for training an AI model of an automated tool to estimate varnish fill percentage from images of axial sections of a stator using a second technique.
Figure 15:
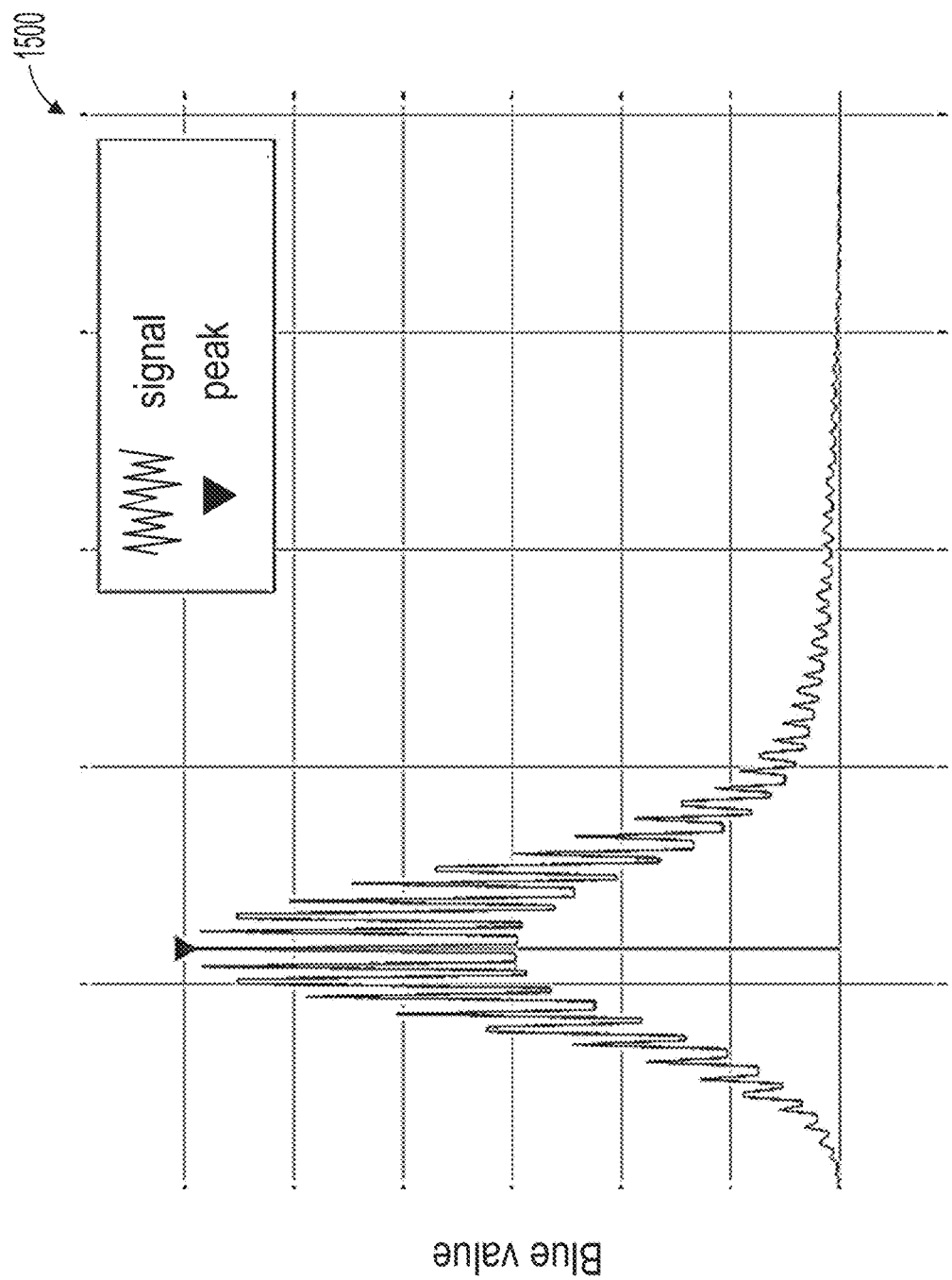
FIG. 15 shows an example of a plot of blue value for an image cluster used in the second technique of FIG. 14.
Figure 16:
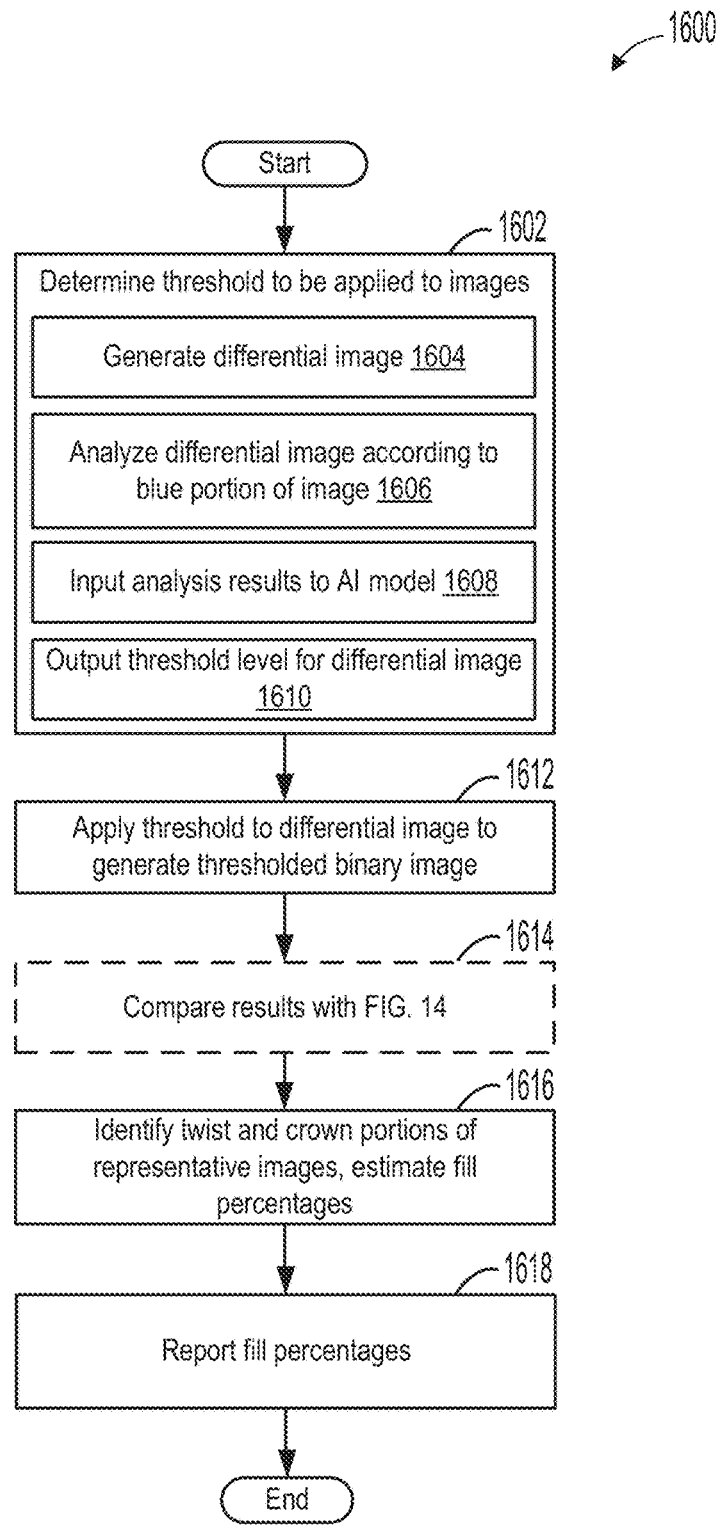
FIG. 16 shows an example of a method for training an AI model of an automated tool to estimate varnish fill percentage from images of axial sections of a stator using a third technique.
Figure 17A:
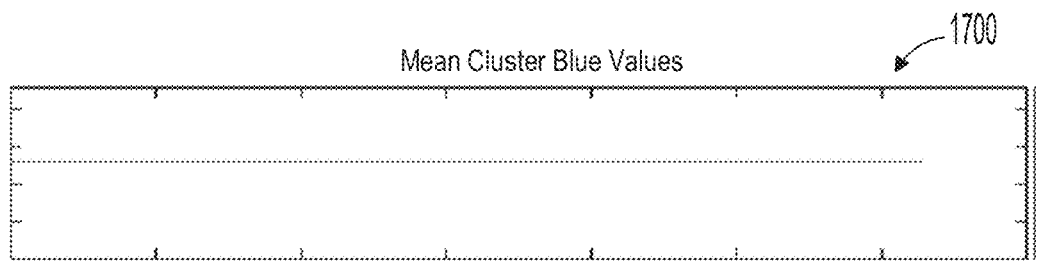
FIGS. 17A-17E shows a series of graphs plotting image parameters for the images according to the third technique of FIG. 16.
Figure 17B:
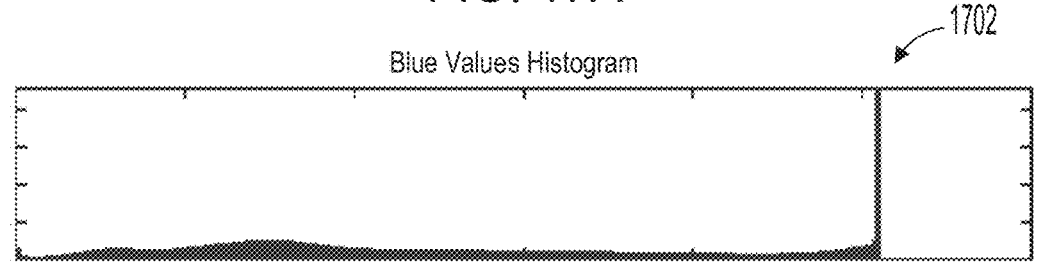
Figure 17C:
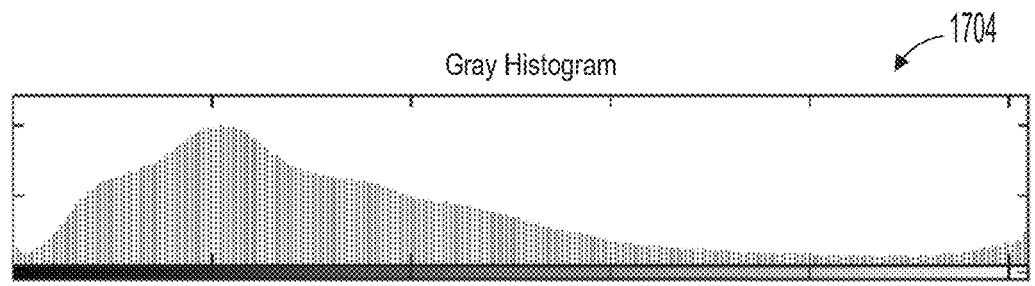
Figure 17D:
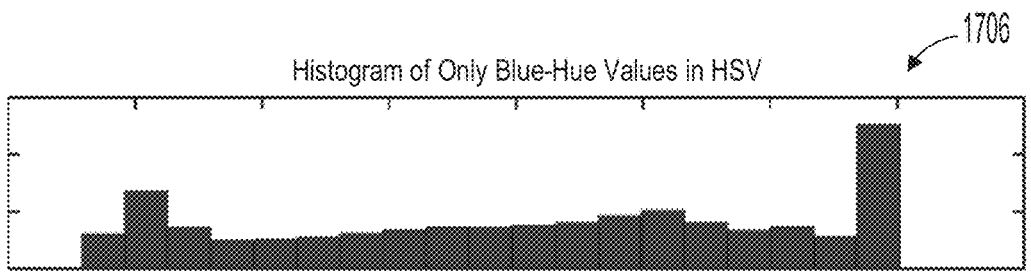
Figure 17E:
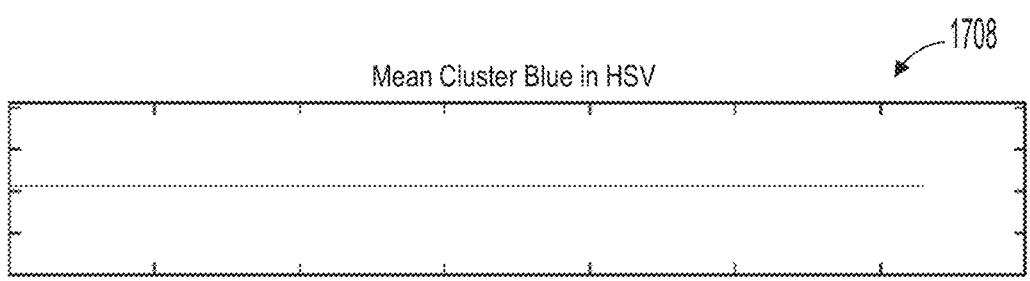
Figure 18A:
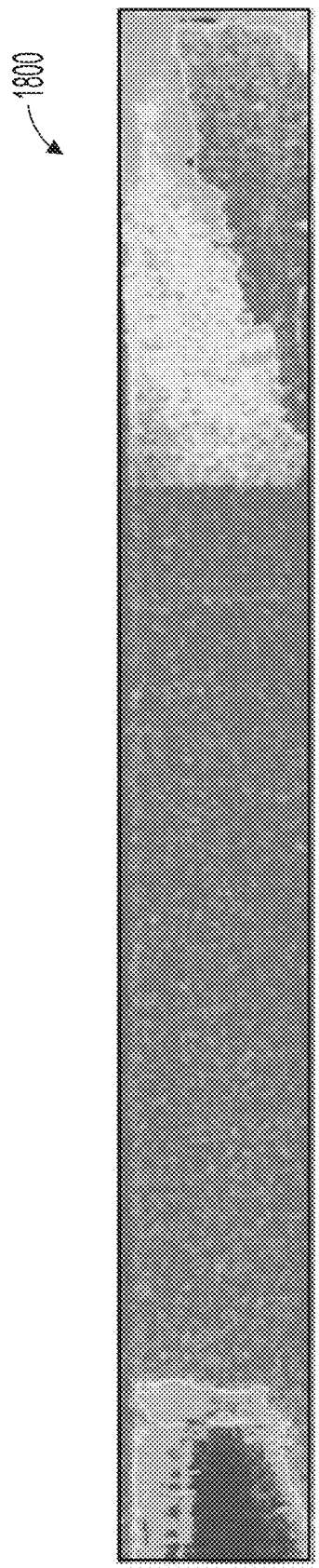
FIG. 18A shows a red, green, blue (RGB) color space differential image which may be used in the third technique of FIG. 16.
Figure 18B:
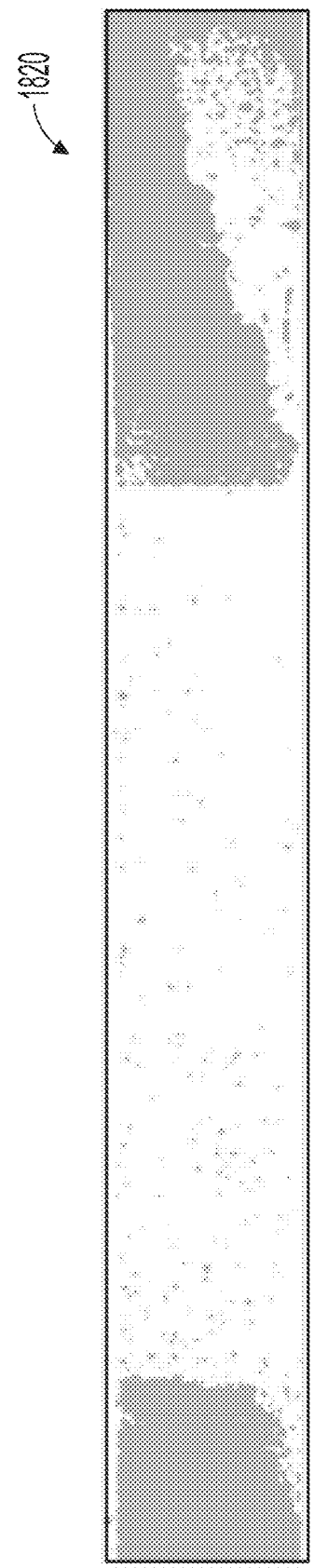
FIG. 18B shows a thresholded binary image generated from the differential image of FIG. 18A, which may be used in the third technique of FIG. 16.

An example of a second technique for training the AI model of the automated tool based on the images of the axial cross-sections of the stator is depicted in FIG. 14. The second technique may also use color distribution analysis via k-mean clustering to process the images for analysis by the AI model. An example of analysis of an image cluster is shown in a plot of blue value for the image cluster in FIG. 15. Alternatively, the images of the axial cross-sections may be analyzed by an AI model trained via a third technique that also relies on color distribution analysis. An example of the third technique for training the AI model is shown in FIG. 16, which may rely on application of an image parameter threshold to create a binary mask. Examples of image parameter data used in the third technique for estimating fill percentage are illustrated in FIGS. 17A-17E and an exemplary differential image generated from the application of the image parameter threshold, as well as an exemplary binary image created from processing of the differential image, are illustrated in FIGS. 18A and 18B, respectively.

Figure 19:
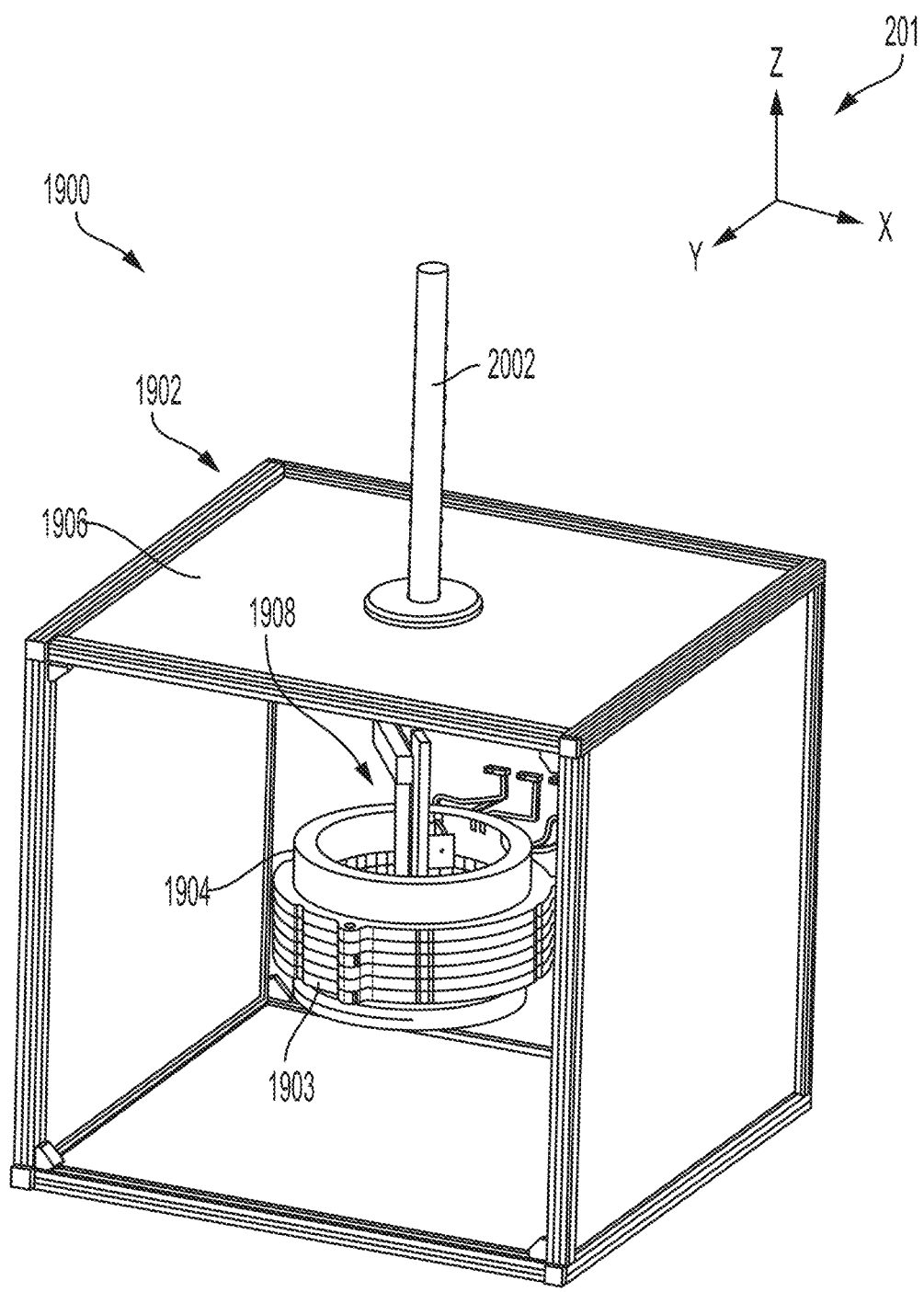
FIG. 19 shows an example system for irradiating a stator with a UV light assembly.
Figure 20:
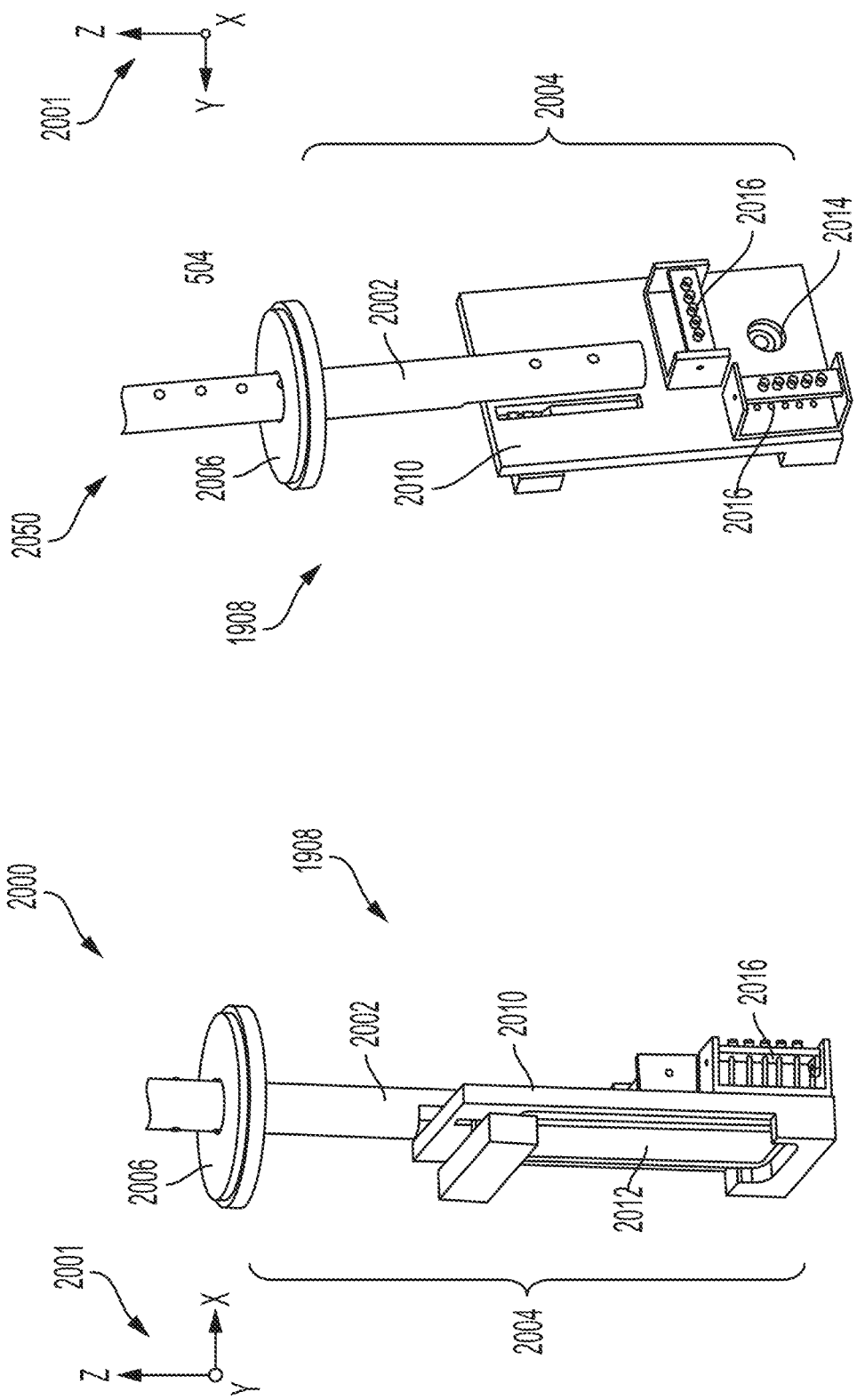
FIG. 20A shows a first view of the UV light assembly of FIG. 19.
FIG. 20B shows a second view of the UV light assembly of FIG. 19.
Figure 21:
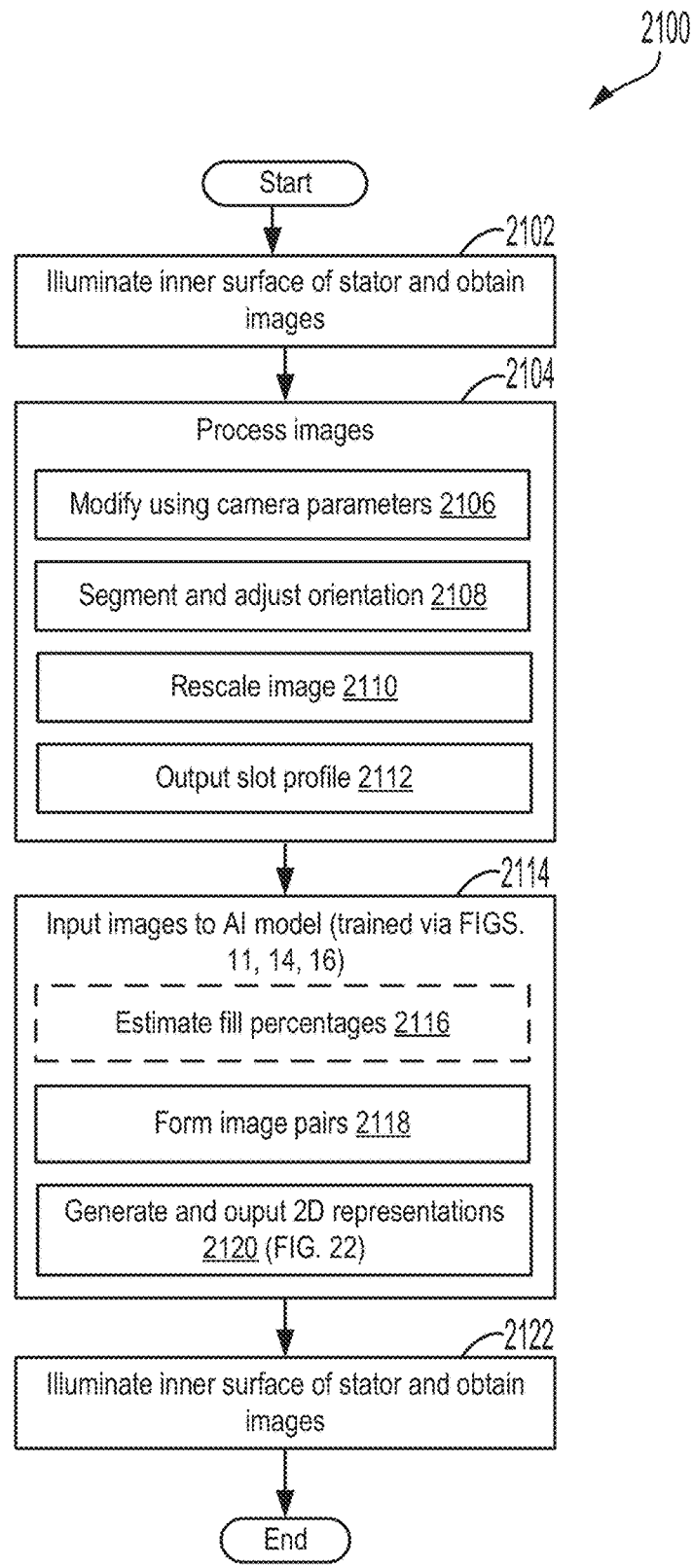
FIG. 21 shows an example of a nondestructive method for generating two-dimensional (2D) representations of varnish distribution at slots of a stator, based on images acquired via the system of FIG. 19.
Figure 22:
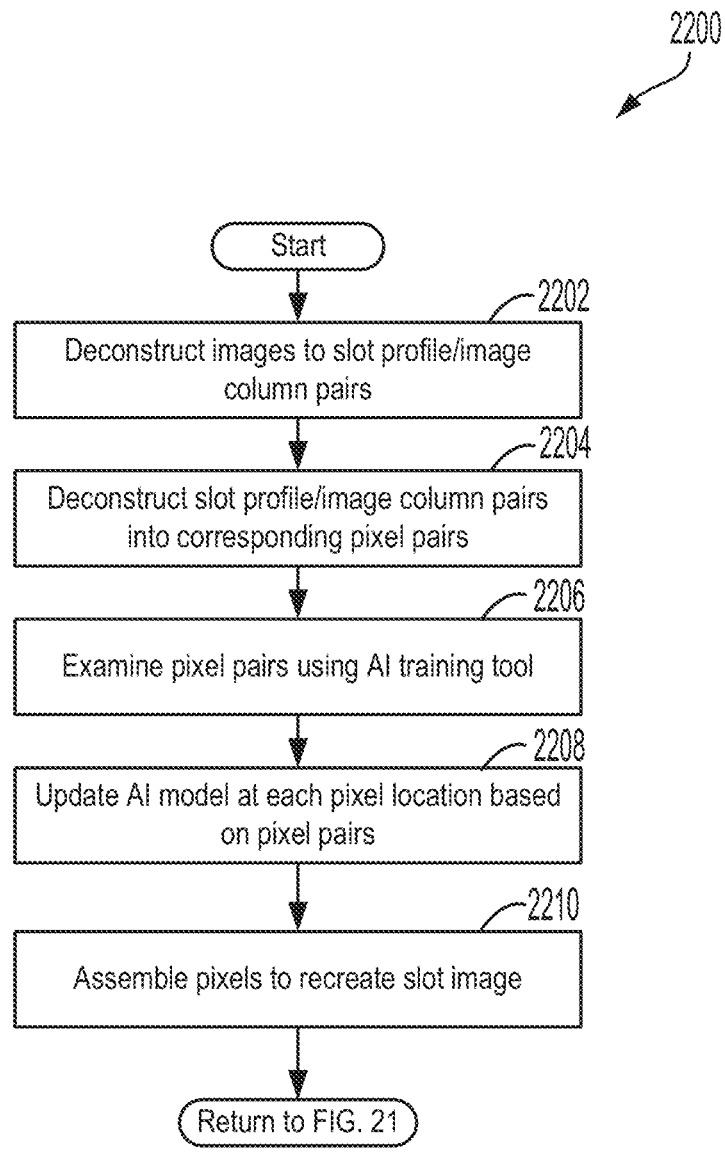
FIG. 22 shows an example of a method for utilizing a machine learning model to generate the 2D representations of FIG. 21.

As described above, the automated tool may be applied to images of the inner surface of the stator to determine the varnish fill percentages at the stator slots based on fluorescence of the varnish. This may be achieved without slicing the stator into sections, providing a non-destructive strategy for evaluating varnish condition. The images of the inner surface of the stator may be acquired using a system including a light box and a UV light assembly, as illustrated in FIG. 19. More detailed views of the UV light assembly are depicted in FIGS. 20A-20B. The images may be processed and fed to the AI model, trained via one of the four techniques of FIGS. 7, 11, 14, and 16, to obtain the estimated varnish fill percentages, as shown in FIG. 21 by a nondestructive method for predicting the varnish condition of a stator. The nondestructive method may include a process for matching segments of the images with ground truth images and deconstructing the images to output predicted pixels from the AI model, as shown in FIG. 22 by an example of a method for applying AI algorithms to the images, and illustrated in FIGS. 23-24.

Figure 1:
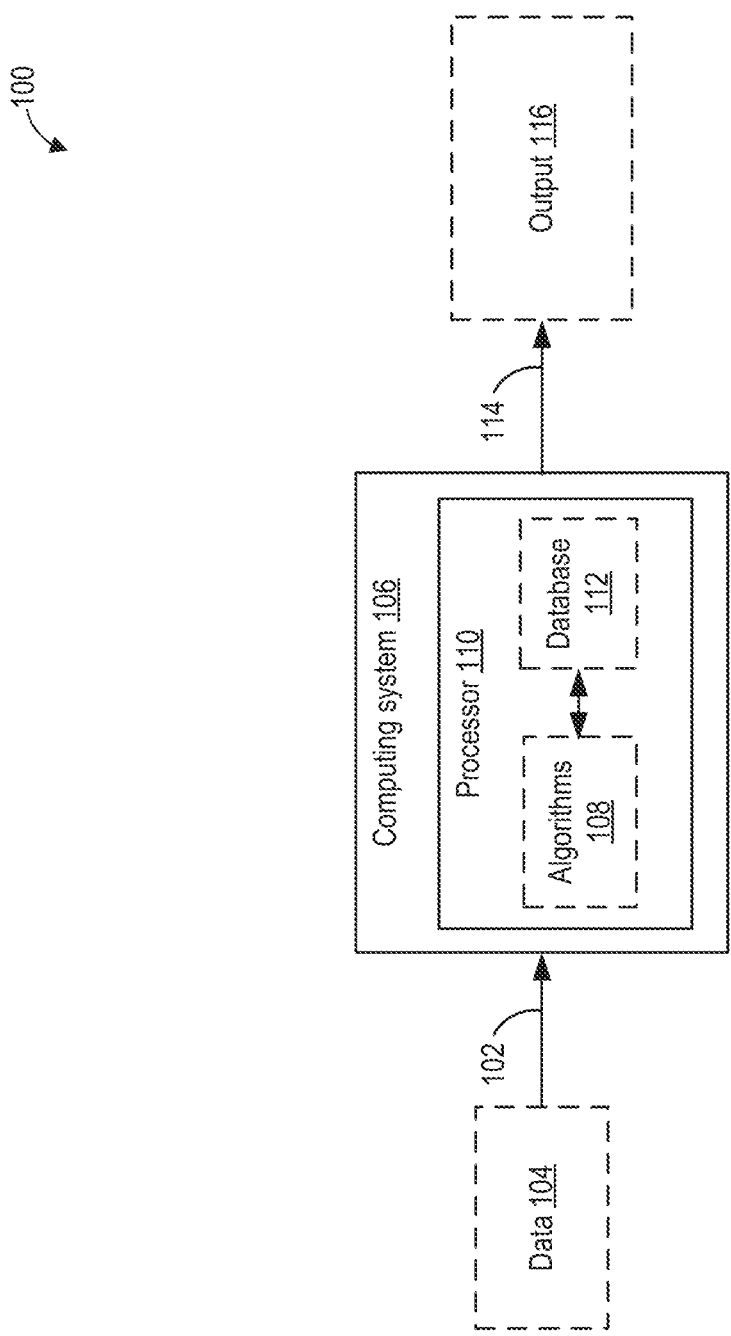
FIG. 1 shows a block diagram of a process for predicting a varnish condition of a stator.

A general process for utilizing image processing and AI algorithms for predicting a desired parameter, value, result, etc. is illustrated in FIG. 1 in a block diagram 100. Portions of the process corresponding to hardware components are depicted in solid lines while portions corresponding to data and algorithm-based components (e.g., software) are shown in dashed lines. The process may include, at step 102, inputting data 104 to a computing system 106. The data 104 may be acquired according to a format that allows the data to be recognized and manipulated by algorithms 108 implemented at a processor 110 of the computing system 106. It will be appreciated that the computing system 106 may include various other components, including hardware and software components not shown in FIG. 1 for brevity. In one example, as described further below, the data input to the computing system 106 may include images, such as visible light images (e.g., photographs) and fluorescence images.

The algorithms 108 may include a plurality of data processing algorithms stored at a memory, such as non-transitory memory, of the processor 110 and may provide instructions for manipulating, analyzing, and processing the data 104. For example, the algorithms 108 may include software for cropping images, matching images, aligning images, converting the images into different formats, etc. In addition, the algorithms 108 may include one or more AI-based models for automatically analyzing the images according to a target output 116. The AI-based models may utilize machine learning, including deep learning, to allow the AI-based models to be trained and continuously updated to generate the target output 116.

The computing system 106 may also include a database 112 storing information relevant to processing of the data 104 and at which at least some of the data 104 may be stored. In some examples, information stored at the database 112 may be used for training the AI-based models and for cross-correlation of the data 104 (e.g., newly input data) with the stored information. As such, the database 112 may initially have a quantity of training information that increases with time as more information is collected and input to the computing system 106. An accuracy of the AI-based models may therefore increase as the database grows.

As shown in FIG. 1, the algorithms 108 may provide an output that is displayed, via hardware of the computing system 106 (such as a display screen of a display device, for example) at step 114. The output 116 may be a visual representation of a prediction generated by the image processing algorithms, such as a graph, a table, an image, or combinations thereof. The output 116 may therefore include a visual display of predictions and estimates generated by the algorithms 108 that presents the output 116 in a comprehensive, concise, and/or traceable format to a user.

Figure 2A:
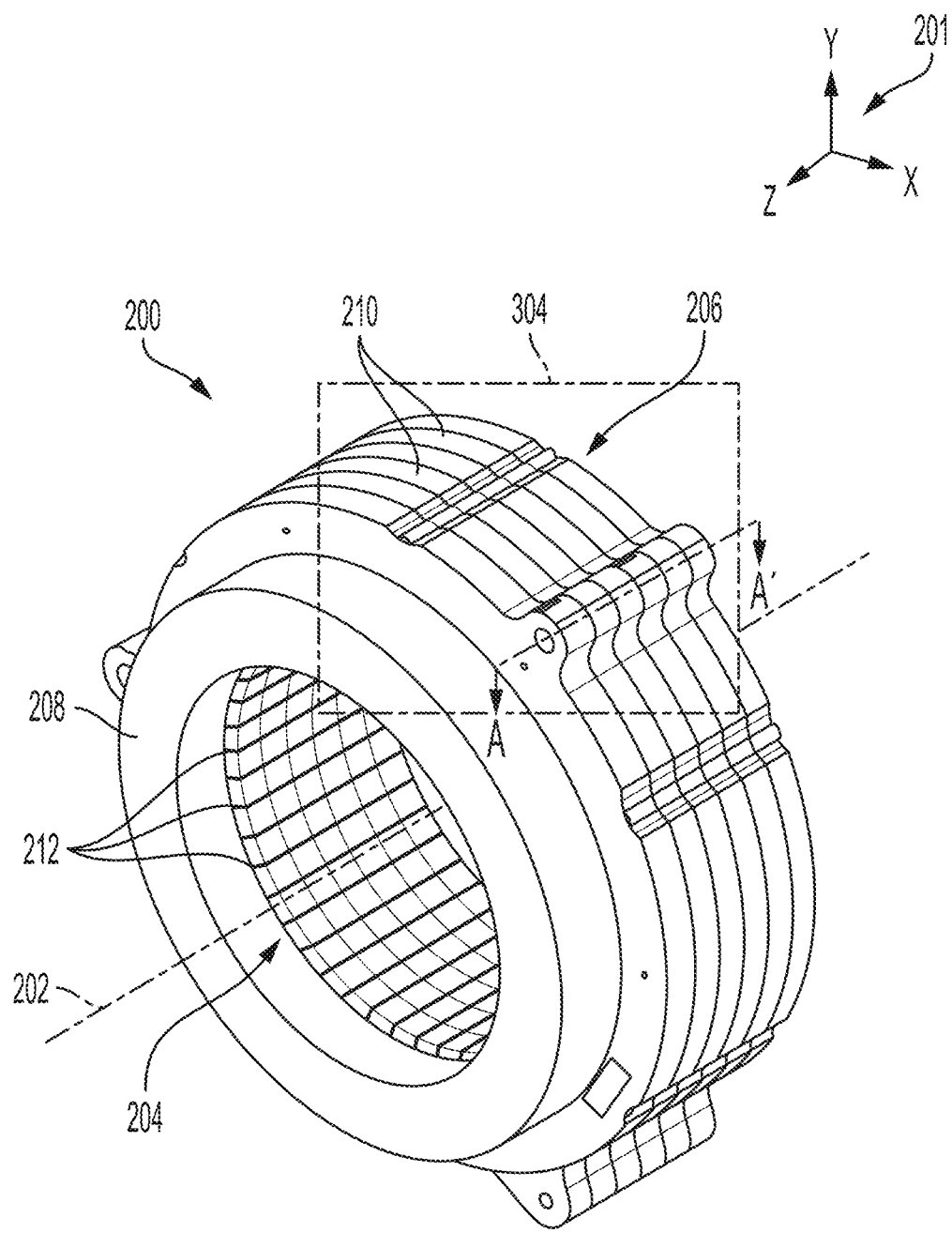
FIG. 2A shows a perspective view of an example of a stator which may include an insulation system coating windings of the stator.
Figure 2B:
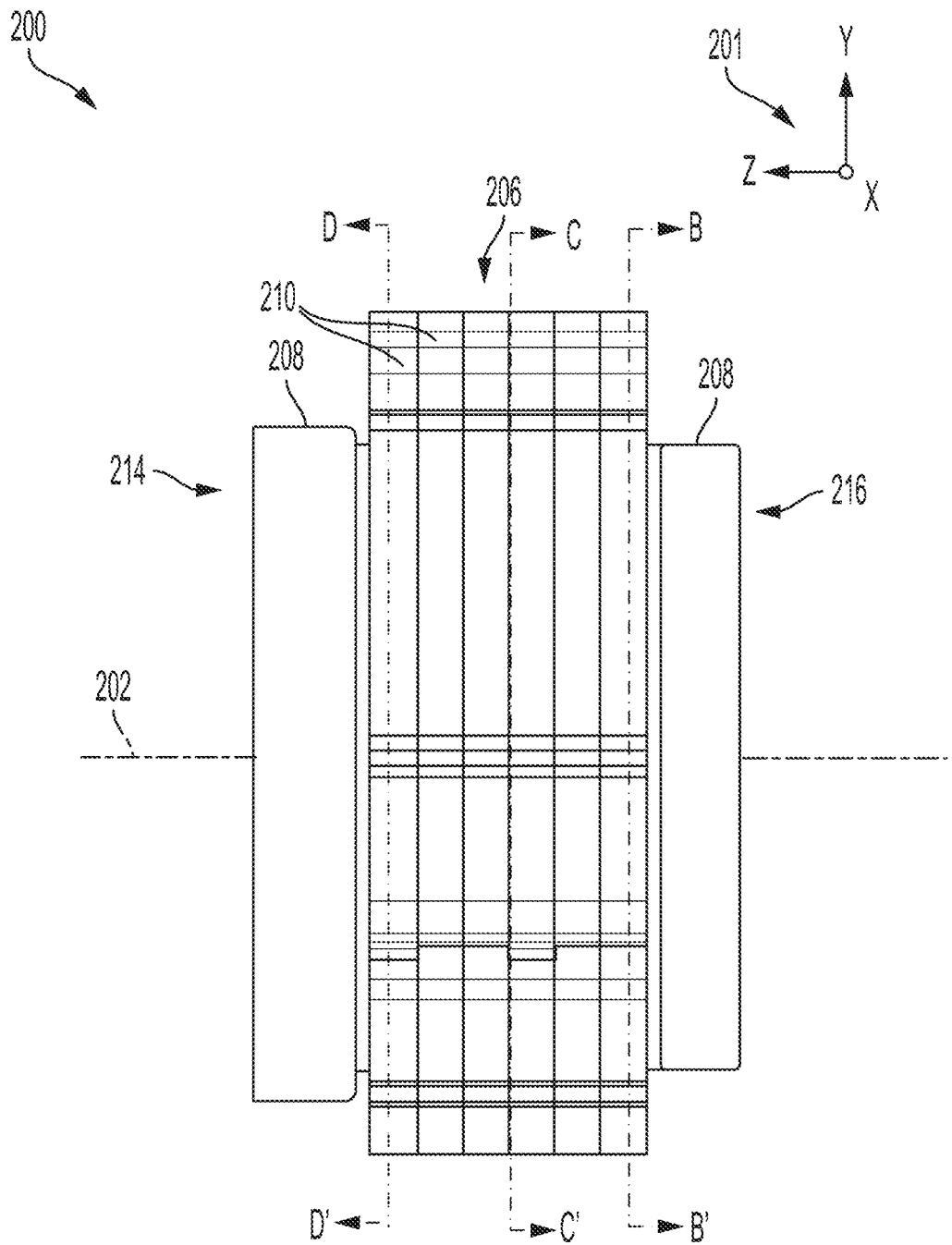
FIG. 2B shows a profile view of the stator of FIG. 2A.
Figure 3A:
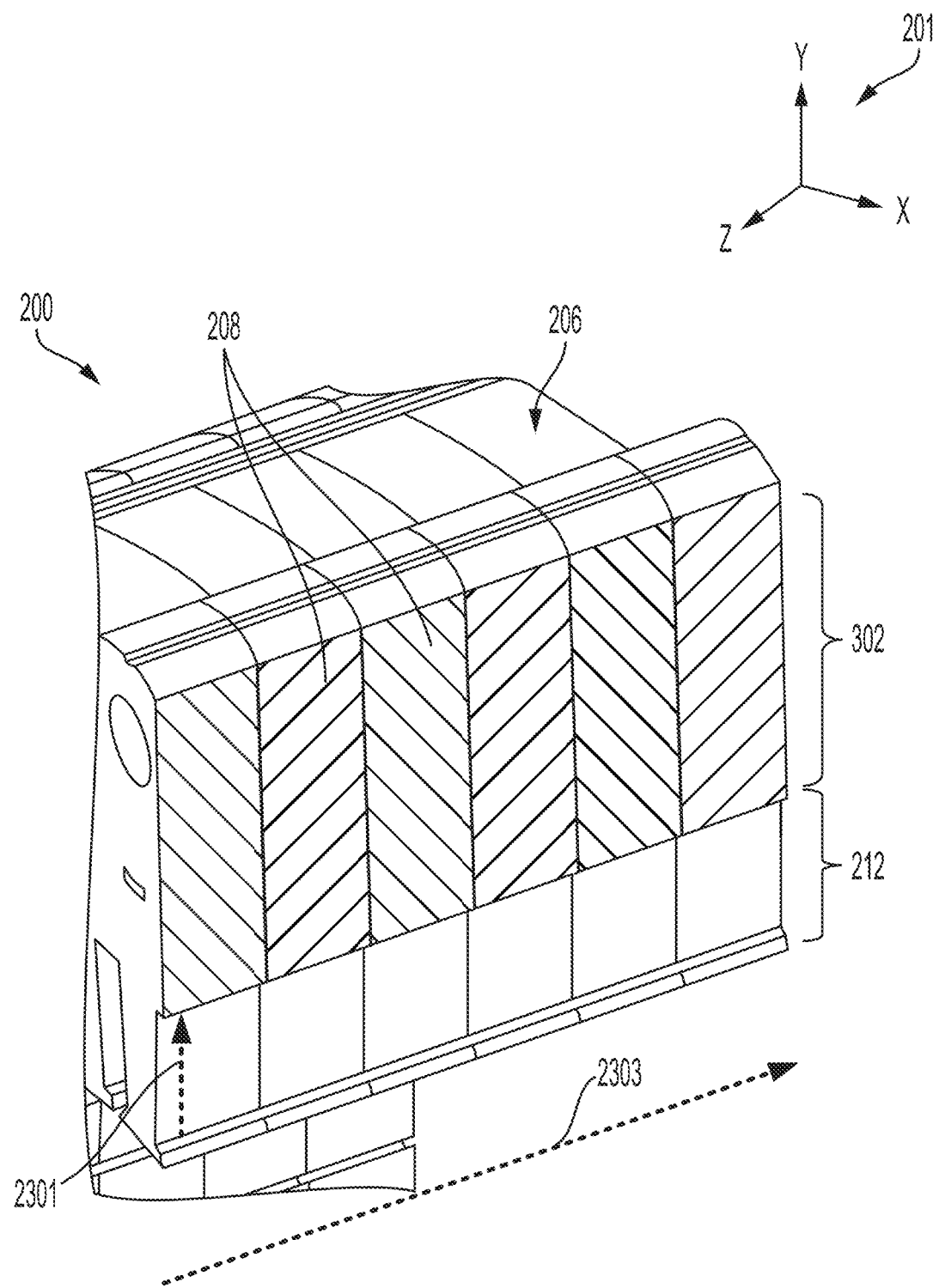
FIG. 3A shows a cross-sectional view of the stator of FIGS. 2A-2B, with windings of the stator omitted for clarity.
Figure 3B:
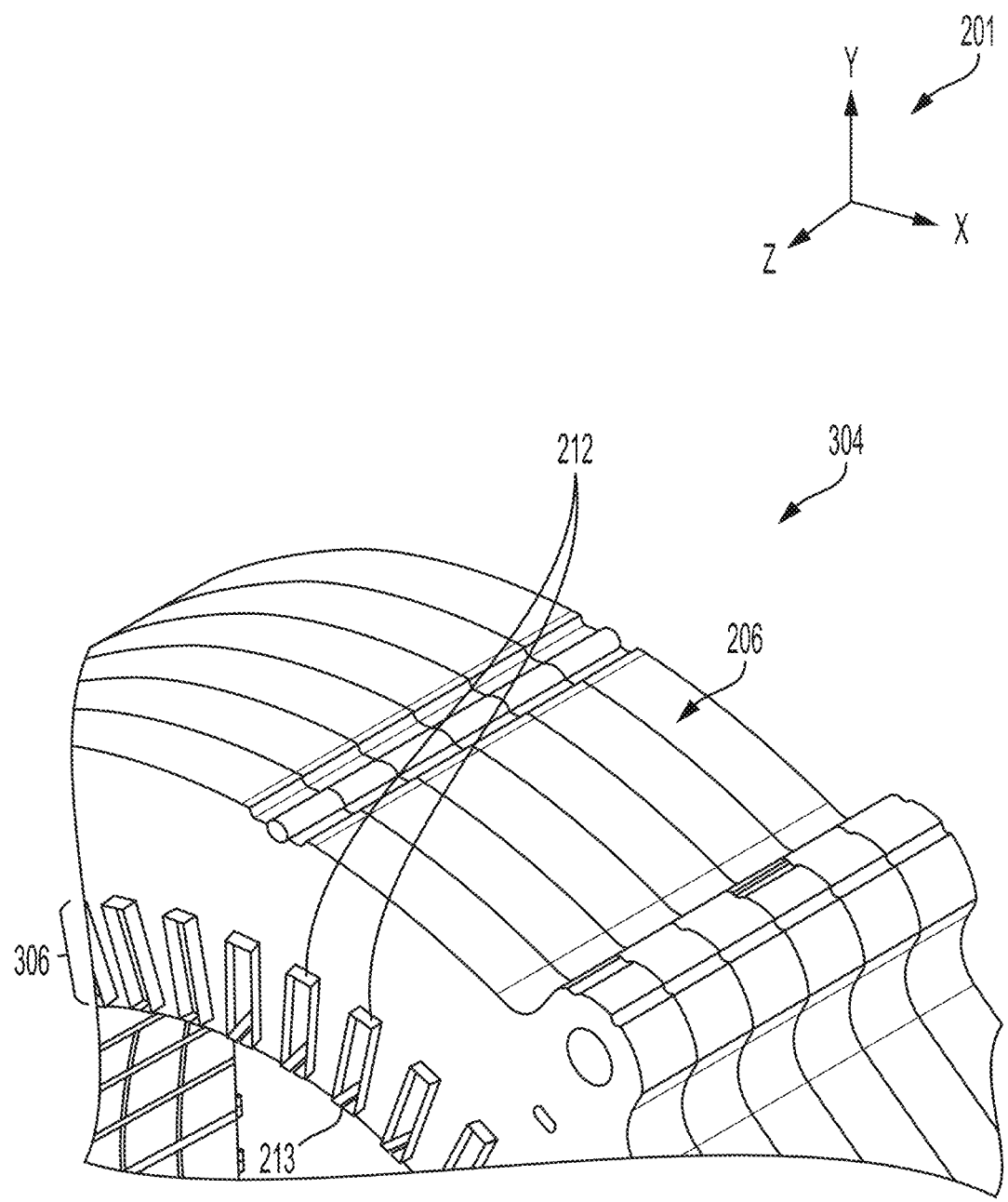
FIG. 3B shows a magnified view of a portion of the stator of FIGS. 2A-2B.

Turning now to FIGS. 2A-2B, an example of a stator 200 for an electric motor is depicted from a perspective view and a profile view, respectively. A set of reference axes 201 is provided, including an x-axis, a y-axis, and a z-axis. The stator 200 has a cylindrical geometry with a central axis of rotation 202 that is aligned parallel with the z-axis, as well as an inner passage 204 extending entirely through a length of the stator 200, where the length is defined along the z-axis. When the electric motor is fully assembled, a rotor may be inserted through the inner passage 204 of the stator 200. It will be appreciated that the stator 200 shown in FIGS. 2A-2B is a non-limiting example and variations in a configuration of the stator 200, are possible without departing from the scope of the present disclosure.

The stator 200 has a core 206 formed of at least one durable, heat tolerant material. For example, the core 206 may have an exterior layer formed of stainless steel and an inner portion supporting copper conductors. For example, windings 208 may be coupled to the core 206, where the windings 208 may be formed of electrically conductive wires such as copper wires. When a potential is applied to the windings 208, current flow through the windings 208 may generate a first magnetic field in the stator 200. The first magnetic field may interact with a second magnetic field generated at a rotor positioned within the stator 200 and the interaction may cause the rotor to spin. The core 206 may be divided axially/longitudinally, e.g., along the central axis of rotation 202, into a plurality of sections 210, or laminations.

The core 206 may therefore be formed of the plurality of sections 210 stacked contiguously along the central axis of rotation 202, as shown in FIG. 3A in a cross-sectional view of the core 206, where the cross-section is taken along line A-A' of FIG. 2A. It will be noted that the windings are omitted in FIG. 3A for clarity. A cut portion 302 of the core 206 is indicated by hatching, which may be included an in outer region of the core 206 (e.g., relative to the central axis of rotation 202 of FIGS. 2A-2B), while an inner, uncut portion of the core 206 forms a side surface of one of a number of slots 212 disposed within the inner portion of the core 206.

The cutaway view of FIG. 3A shows that each of the plurality of sections 210 of the core 206 are similarly shaped and sized. The slot 212 extends into each of the plurality of sections 210 such that the slot 212 is formed along the entire length of the core 206. Returning to FIG. 2A, the slots 212 may be evenly distributed around the inner surface of the core 206. The windings 208 may be wound through the slots 212 such that the windings 208 are also distributed evenly around the core 206 and protrude from opposite ends of the core 206. For example, as illustrated in FIG. 2B, the windings 208 may extend beyond the core 206 along the central axis of rotation 202 at a first end 214 of the stator 200 and a second end 216 of the stator 200, the first end 214 opposite of the second end 216. In one example, the first end 214 may be a twist end of the windings 208 at which ends of the windings 208 are twisted together in pairs. At the second end 216, which may be a crown end of the windings 208, bends of the windings 208 may protrude from the core 206.

The slots 212 may each accommodate threading of a bundle of the windings 208 therethrough. A more detailed view of the slots 212, with the windings 208 omitted for clarity, is depicted in FIG. 3B. A portion of the stator 200 represented in FIG. 3B is indicated in FIG. 2A by dashed rectangle 304. As described above, the slots 212 are distributed evenly apart around an inner circumference of the core 206, extending from the inner surface of the core 206 into a portion of a thickness of the core 206, the thickness defined along a radial direction perpendicular to the central axis of rotation 202 (as shown in FIGS. 2A-2B). The slots 212 may be narrow in width, where the width is defined along the circumference of the core 206. As an example, the width of the slots 212 may be less than a distance between adjacent slots 212. Furthermore, the width of the slots 212 at the inner surface of the core 206, e.g., at a mouth 213 of each of the slots 212, may be narrower than a central region of the slots to retain a position of the windings 208 within the slots 212, thereby mitigating unwinding of the windings 208 through the mouth 213 of each of the slots 212. As a result of the narrowed mouths 213 of the slots 212, visual inspection of the windings 208 within the slots 212 may be obscured.

The stator may be configured with an insulation system for mitigating electrical shorting, providing a moisture barrier, and increasing a mechanical strength of the stator windings. In some examples, the insulation system may include insulating paper lining the slots of the core. The insulating paper may be positioned between the windings and surfaces of the core in the slots such that the windings do not directly contact the stator core within the slots. In other examples, however, a different material other than insulating paper may be used. Additionally or alternatively, the insulation system of the stator may include a coating applied to the windings, the coating composed of an insulating and encapsulating material, such as a varnish. The varnish may be added to the windings after the windings are wound through the slots of the core via methods such as dip-and-bake, trickle varnishing, vacuum pressure impregnation, etc. Gaps between surfaces of the slot and the insulating paper, and between the insulating paper and the windings, may be filled with varnish upon application. Regardless of application method, subsequent confirmation that the varnish has been applied to the windings as a uniform and continuous coating, as well as quantification of an amount of varnish in the slots, may be challenging.

For example, visual examination may not be feasible as the varnish may be a clear, colorless material and the coated windings within the stator slots may be obstructed from view. Electrical testing, such as insulation resistance tests, may confirm isolation between the stator core and phases (e.g., bundles of windings). The testing results may not indicate an amount of the varnish bonding components together, however, or, when the coating is determined to not be continuous, where a gap or voids in the coating may be located along the windings. In order to confirm that the coating is sufficiently thick and uniform to reliably withstand electric motor operating conditions over a desired period of time, thorough examination of the varnish may demand cutting a stator open to analyze the varnish within the stator slots. For example, cross-sectional areas of the stator may be illuminated with UV light to induce fluorescence of the varnish and allow capture of fluorescence images. Varnish may be identified and quantified by analysis of the fluorescence images.

Analysis of the fluorescence images may be performed via image processing software operated by a user. While the image processing software may allow detailed examination of the images, assignment of image parameters for identifying varnish and measurement of the vanish in the images is conducted by the user. A reproducibility of imaging analysis results may be low due to variability in irradiation of the cross-sectional areas, as well as in visual assessment of the images during varnish measurement, leading to poor consistency between analyses of different stator sections and between different users. As well, in order to confirm that the coating is sufficiently thick and uniform to reliably withstand electric motor operating conditions over a desired period of time, thorough examination of the varnish may demand cutting a stator open to analyze the varnish within the stator slots. Thus, in order to achieve a desired quality of varnish coating, more than one stator may be sacrificed during manufacturing, leading to increased costs. Furthermore, sample preparation (e.g., slicing stators into sections), image acquisition, and manual processing (e.g., performed by the user) of the images may be time-consuming and incur high costs.

The issues described above may be at least partially mitigated by implementing an automated tool for evaluating the varnish condition from fluorescence images that reduces both variability in results and a duration of time to obtain the results. The automated tool may utilize one or more of image analysis based on color distribution, machine learning, and deep learning to locate and quantify varnish in the images in a consistent and reproducible manner. Varnish fill percentages of the slots may be estimated using the automated tool, which may be presented to the user as a comprehensive visual representation, such as a table or chart reporting the fill percentage for each imaged slot. In some examples, the analyzed stator may remain intact and insufficient insulation of the stator windings may be addressed without loss of product. In addition, the strategy described herein enables detection of imaging differences undiscernible by the human eye, and enables data analysis and compilation at a resolution that may be unattainable within the visible spectrum of light. Details of the automated tool are provided further below.

An example of a high level method 400 for evaluating a varnish condition of a stator is shown in FIG. 4. Method 400, and the rest of the methods described herein, may be executed by a processor of a computing system, such as the processor 110 of FIG. 1. As shown in FIG. 1, the processor may be configured with image processing algorithms which may include both non-AI and AI algorithms. The stator may be a stator with a slotted inner surface, as shown in FIGS. 2A-3B, with windings wound through slots of the stator and the slots lined with insulating paper. Sections of the stator (e.g., cross-sections) may be analyzed via method 400, the sections being either transverse sections, e.g., the stator is cut along planes perpendicular to a central axis of rotation of the stator, or axial sections, e.g., the stator is cut along a length of the stator, the length being parallel with the central axis of rotation.

When cut transversely, the transverse images used for processing may be images of individual windings (e.g., wire conductors) of the stator rather than the stator core. The windings may be aligned along a linear axis in the transverse images for more efficient processing. When cut axially, the stator may be sliced through at least one of the slots, allowing side surfaces of the slot to be imaged. In other words, the transverse images show cross-sectional areas of the windings while the axial images show cross-sectional areas of the stator core, at the slots.

Figure 5:
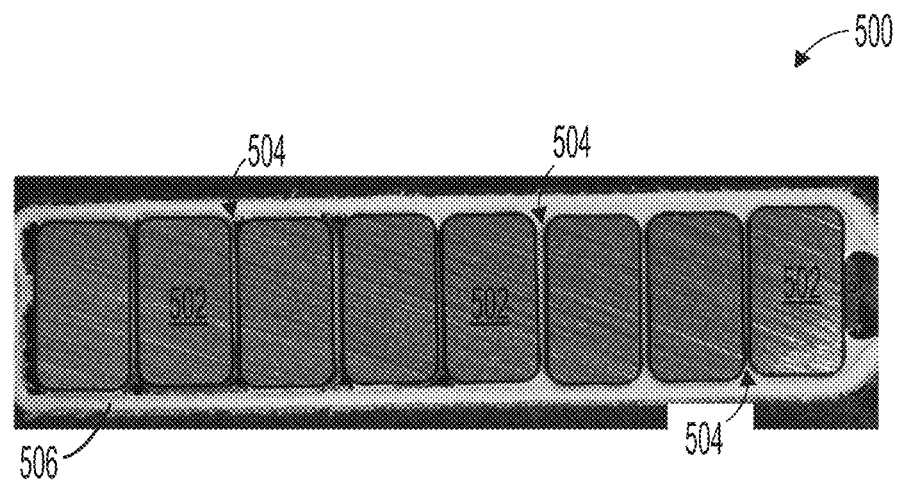
FIG. 5 shows an example of an image of windings from a transverse section of a stator.
Figure 6:
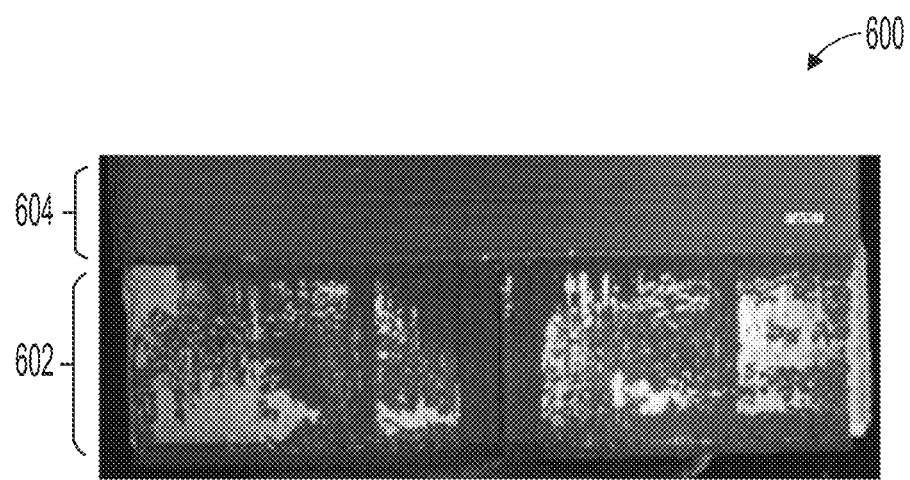
FIG. 6 shows an example of an image of an axial section of a stator.

An example of an image of a transverse section of a stator is depicted in a first image 500 in FIG. 5 and an example of an image of an axial section of a stator is depicted in a second image 600 in FIG. 6. The first image 500 does not include the stator core and instead shows a plurality of conductors 502 of the stator. In contrast, the second image 600 shows a portion of the stator core that includes a surface of a slot 602. Further details of the first and second images 500, 600 are provided further below.

Additionally or alternatively, method 400 may be applied to images of an inner surface of an intact stator (e.g., a stator that is not cut) for obtaining estimated varnish fill percentages of the stator slots. The intact stator may be irradiated using an imaging system described further below, with reference to FIGS. 19-20B. While method 400 is similarly applicable to both sections of stators and intact stators, specific details of varnish analysis for the intact stators is provided in FIGS. 21-22. Furthermore, while method 400 provides a strategy for obtaining a numerical result from the automated tool, FIGS. 21-22 provides additional protocols for obtaining a 2D representation of the varnish condition. In other words, methods 2100 and 2200 of FIGS. 21-22, respectively, may be used for images of the intact stator in place of method 400 when the 2D representation is desired, with method 400 being a broader overview of processes enabled by the automated tool. As such, details of systems and strategies pertaining to processing and analysis of images of the intact stator are provided further below, with respect to FIGS. 19-24. The following descriptions of FIGS. 5-18B are directed to processing and analysis of images of transverse and axial stator sections.

Returning to FIG. 4, at 402, method 400 includes acquiring images of the stator. Acquiring images of the stator includes, more specifically, obtaining images of at least one slot of the stator by irradiating cross-sections (e.g., transverse or axial sections) of the stator or an inner surface of the stator. The images may include at least fluorescence image, obtained by irradiating the stator with UV light from a UV light source. A wavelength of UV light emitted from the UV light source may be selected based upon a predetermined target wavelength or wavelength range that induces fluorescence at the varnish. Absorption of UV light by the varnish may cause atomic excitation, followed by emission of light from the varnish, e.g., photoluminescence, at longer wavelengths than the incident light. As an example, the wavelength of the UV light may be between 350 nm and 450 nm while a wavelength of light emitted via fluorescence by the varnish may be between 400 nm and 475 nm.

In order to obtain reproducible analysis of the images, the images may be collected using consistent image acquisition settings at digital imaging equipment, which may include a microscope, an optical instrument, such as a camera, a fluorescence detector, etc. For example, a pre-set incidence wavelength, detection wavelength, focus, focal depth, lighting, incident wavelength angle, detector positioning, stator section orientation, etc., may be used for all imaging events for each stator section. In addition, in some examples, the stator section may be enclosed within a housing during imaging, with the housing configured to support and accommodate positioning of the UV light source therein. An example of such a housing is illustrated in FIG. 19. By enclosing the stator section and UV light source within the housing during image acquisition, adverse image effects from external lighting and contamination by debris may be circumvented.

At 404, method 400 includes processing the acquired images and feeding the acquired images to a trained AI model of the automated tool. For example, the images may be temporarily stored in a transient memory of the computing system and delivered to the processor for analysis by the image processing algorithms of the automated tool. Alternatively, the images may be stored at a database of the computing system and may be retrieved by user request to be transmitted to the image processing algorithms. Upon receiving the images, the automated tool may be configured with instructions for processing the images for analysis, e.g., one or more of segmenting, cropping, aligning, and filtering. Furthermore, processing the images may include labelling at least one of a twist end and a crown end of the images. The labelling may be applied by a user or by the image processing algorithms, or by a combination of both. The processing may be performed and, at 406, the images may be analyzed using the trained AI model to identify varnish, and in some examples, voids in the varnish. An output of the automated tool may include fill percentages determined based on the varnish identification and analysis. Further details of specific training strategies for image analysis and varnish quantification are provided further below with reference to FIGS. 7, 11, 14, and 16.

The fill percentages may be displayed at 408. For example, the fill percentages may be presented at a display screen of a display device as a visual representation, such as a report. An example of such a report 1000 is illustrated in FIG. 10. In addition to the fill percentages for the slots, the report 1000 may further include information such as a slot number, a position of a cross-section corresponding to a set of fill percentages for a specific image, e.g., a twist, a central, or a crown transverse section as indicated by lines D-D', C-C', and A-A' indicated in FIG. 2B, and the surface area and varnish area of each slot. Method 400 ends.

As described above, the automated tool may be used to process both transverse sections and axial sections of the stator. Depending on the section type, the algorithms and techniques used to determine the fill percentages may differ. For example, in the transverse sections, the stator may be cut such that an inner region of the stator core, corresponding to a depth of the slots, is presented. An example of a first image 500 of a stator section is shown in FIG. 5, where the stator section is a transverse section. For example, the transverse section may be obtained by slicing the stator along one or more of the line B-B', the line C-C', and the line D-D' indicated in FIG. 2B. Slicing the stator along the first, second, and third lines may provide transverse section images at a crown end, a central region, and a twist end of the stator, respectively.

As depicted in FIG. 5, the first image 500 shows a plurality of conductors 502, which may be aligned along a radial direction relative to a central axis of rotation of a stator, within a slot of the stator. Each of the plurality of conductors 502 is a copper wire and may be spaced away from adjacent conductors by gaps 504. In other words, each of the gaps 504 is located between two of the plurality of conductors 502. The gaps 504 may be spaces between the plurality of conductors into which varnish may be deposited upon application to the stator. Further, the gaps 504 may extend along a portion of a thickness of the stator within an inner portion of the stator core. As an example, the inner portion is indicated by bracket 306 in FIG. 3B.

Insulating paper 506 surrounds the plurality of conductors 502, forming a continuous border around the plurality of conductors 502. As described above, the insulating paper may be arranged between outer surfaces of the plurality of conductors 502 and surface of the slot in which the plurality of conductors 502 are located. The outer surfaces of the plurality of conductors 502 may be surfaces that are perpendicular to surfaces adjacent to the gaps 504. Varnish may be present both in the gaps 504 between the plurality of conductors 502 and in spaces between outer surfaces of the plurality of conductors 502 and the insulating paper 506. The first image 500 may also depict voids in the varnish, shown as dark regions around the plurality of conductors 502 in FIG. 5. Identification and analysis of varnish around the plurality of conductors 502, e.g., by the deep learning tool, may therefore allow a relative amount of varnish coating the plurality of conductors to be estimated.

A second image 600 of a stator section is shown in FIG. 6, where the stator section is an axial section. For example, the axial section may be obtained by slicing a stator along a central axis of rotation of the stator, through a slot 602 of the stator. The stator section of FIG. 6 may be analogous to the cross-sectional view of the stator 200 of FIG. 3A with the slot 602 of FIG. 6 being similar to the slot 212 of FIG. 3A. The slot 602 therefore extends along a length of the stator with a cut portion 604 of the stator depicted above the slot 602. It will be noted that the second image 600 does not show an entire area of the cut portion 604 and insulating paper is removed from the slot 602. Varnish identified along a surface of the slot 602 may therefore represent varnish filling gaps between the surface of the slot 602 and the insulating paper. The varnish identified in images of axial sections of the stator may therefore be analyzed to estimate fill percentages of the stator slots.

As described above, an automated tool may be used to estimate varnish fill percentages at slots of a stator based on analysis of stator section images. In one example, the automated tool may include AI algorithms, including methodologies for machine learning and deep learning, to train an AI model of the automated tool to predict a condition of at least a portion of an insulation system of the stator. The portion of the insulation system may be a coating of varnish at the stator slots, applied to windings of the stator, and the AI model of the automated tool may hereafter be referred to as an insulation prediction model. In one example, the insulation prediction model may be a machine learning model.

The stator section type, e.g., transverse versus axial, may provide distinct views, respectively, of the slots (e.g., either showing cross-sectional areas of the stator windings or a surface of the slots) as well as, for the transverse sections, insulating paper lining the slots. As such, analysis of the images may rely on different techniques depending on the stator section type depicted in the images. In some examples, the training of the insulation prediction model may include image analysis using more than one technique followed by comparison of respective results to determine which technique provides more accurate results, as described further below.

Depending on whether the images are of transverse sections or of axial sections, application of the trained insulation prediction model to each section type may include accounting for differences in image processing and transformations of data. For example, processing and analysis of the transverse sections may be more complex owing to the presence of copper windings (e.g., conductors) and insulating paper in the images and a demand for defining boundaries of the insulating paper around the windings. In order to accurately quantify the varnish in the images of the transverse sections, void detection and correction is conducted, adding to a complexity of image processing and analysis. Identification and estimation of varnish in the images of the axial sections of the stator may therefore present a more simplified and robust approach to automated varnish assessment. A first technique, a second technique, and a third technique, for training the insulation prediction model, as described above, is depicted in FIGS. 11, 14, and 16, respectively.

The first technique, which may rely on clustering analysis, may be applied to the images of the transverse section of the stator (e.g., to images depicting the conductors/windings). Prior to image analysis by the insulation prediction model, processing of the images, in addition to the processing described above with respect to method 400 of FIG. 4, may be demanded, using deep learning. For example, k-means clustering may be used to partition n observations into k clusters, where each observation n belongs to a cluster with a nearest mean. For execution of the first technique, the image processing performed by the automated tool (e.g., as described at 404 of FIG. 4) may include first using a deep learning algorithm to automatically crop the images. For example, a neural network such as Resnet 18 may be used as a basis for the deep learning algorithm to crop the images to edges of a plurality of conductors shown in images (e.g., the plurality of conductors 502 of FIG. 5). The processing of the images may also include applying a Gaussian filter to the cropped images prior to feeding the processed images to the insulation prediction model. By applying the Gaussian filter, the images may be blurred and smoothed to allow for more efficient processing.

An example of a method 700 is shown in FIG. 7 for estimating varnish fill percentages from images of transverse sections of a stator via an automated tool implemented at a processor, e.g., the processor 110 of FIG. 1. Method 700 may be executed, for example, in place of 404 to 408 of method 400 of FIG. 4, where method 700 provides additional details of processing of the images prior to inputting the images to an insulation prediction model. The insulation prediction model may be trained via a method 1100 depicted in FIG. 11, using the processed images provided by method 700. At 702, after acquiring fluorescence images of the transverse sections of the stator and processing the images as described at 402 of FIG. 4, method 700 includes identifying clusters, e.g., data points aggregated together due to at least one similarity that is recognized by image processing algorithms, representing the varnish from the processed images. For example, the vectors in the processed images may be quantized to partition n observations in the processed images into k clusters, where each observation belongs to a cluster with a nearest mean. The processed images may thereby be converted to cluster-only images, using k-means clustering.

For example, to render the cluster more obvious, the processed images may be converted to hue saturation value (HSV) color space, an alternative representation of red, green, blue (RGB) color space. HSV clusters (which may be color-based clusters) may be located from the fluorescence images and converted to the cluster-only images. For example, as shown in FIG. 8, the HSV clusters may be plotted in a graph 800 of saturation relative to hue. The HSV clusters include a first cluster 802, a second cluster 804, and a third cluster 806. Each of the HSV clusters may be converted to a cluster-only image.

Deep learning algorithms implemented by the insulation prediction model may be used to identify which of the HSV clusters represents the varnish. For example, a series of graphs plotting image parameters based on one of the cluster-only images may be generated by the automated tool, as shown in FIGS. 9A-9E. A first input graph 900, as shown in FIG. 9A, of the series of graphs may be a histogram of a blue portion of the cluster-only image and a second input graph 902 of FIG. 9B may be a histogram of the cluster-only image in grayscale. The series of graphs may further include a third input graph 904 of FIG. 9C, which may depict a distribution of sub-cluster areas, a fourth input graph 906 of FIG. 9D, which may show a distribution of major axis lengths of the sub-clusters, and a fifth input graph 908 of FIG. 9E, which may show a distribution of aspect ratios of the sub-clusters. The series of graphs and/or data from the series of graphs may be generated and/or obtained and fed to the insulation prediction model at 704. Information from the HSV clusters may thereby be extracted by analyzing the clusters based on the image parameters depicted in FIGS. 9A-9E and the extracted information may be used to identify varnish in the fluorescence images.

The insulation prediction model may output a likelihood of the cluster (e.g., the cluster corresponding to the cluster-only image input to the model) being the varnish based on analysis of data from the series of input graphs at 706. The likelihood may be provided as a value from 0 to 1, as an example. The insulation prediction model may generate a matrix with multiple identification methods based on the image parameters plotted in FIGS. 9A-9E. An example of a matrix is shown below in Table 1 for the fluorescence image with the first cluster 802, the second cluster 804, and the third cluster 806 of FIG. 8.

TABLE 1

Matrix with identification methods for cluster-only image analysis.

| Cluster ID | Major Axis Length in Range? | Mean Blue Value for Entire Cluster | AI Generated Predictive Index |
|---|---|---|---|
| 1 | TRUE | 50.2708 | 1.0 |
| 2 | 0 | 26.9857 | 0.0 |
| 3 | 0 | 7.848 | 0.0 |

The results shown in Table 1 indicate that the first cluster 802 of FIG. 8 may correspond to varnish. The output of the insulation prediction model may therefore include a selected cluster-only image corresponding to the cluster identified as varnish.

Returning to FIG. 7, at 708, method 700 includes filling in gaps in a paper border of the selected cluster-only image. For example, a gap filling analysis of the selected cluster-only image may be performed. A border representing insulating paper lining the stator slots in the selected cluster-only image may be analyzed for continuity. Ensuring continuity of the insulating paper border in the selected cluster-only image may enable accurate detection of voids in the varnish cluster(s). In some instances, discontinuities in the insulating paper border may arise due to lighting issues and/or varnish penetration. A presence of discontinuities may be determined by generating a binary image from selected cluster-only and filling in the binary image from edges of the binary image to a center of the binary image. A discontinuity may be detected when a change in area between the initial binary image and the filled-in binary image is greater than an area of one of the conductors.

For example, filling in the gaps in the binary image may include applying a paper gap fill method that performs morphological closing at the binary image to produce a continuous border. At 710 of method 700, the filled-in binary image may be combined with the initial binary images by subtracting the initial binary image from the filled-in binary image and a resulting "gap" image may be filtered and added back to the original fluorescence image, creating a new, complete boundary in an adjusted fluorescence image incorporating the process described above. As a result, a paper fill mask is created, based on the images. Voids may be depicted in the paper fill mask.

The voids may be identified and evaluated at 712 of method 700. The void properties may be assessed and quantified, using the image processing algorithms, which may include determining a size of each void, an overall area of the voids and comparing the overall area of the voids to cross-sectional areas of the conductors. The fill percentages may also be estimated at 712 based on the void properties. At 714, the estimated varnish fill percentages may be displayed at a display device as a visual representation, as described above at 408 of FIG. 4 and depicted in FIG. 10.

Turning now to FIG. 11, a method 1100 is shown which utilizes the first technique for training the insulation prediction model, the first technique relying on color distribution analysis of the processed images. The images delivered to the insulation prediction model in method 1100 may be processed as described above, e.g., using deep learning to crop and filter the images. At 1102, method 1100 includes inputting image data to the insulation prediction model, the input data corresponding to the images. The images may be converted to RGB/HSV color space. The input data may include a magnification of the input image, motor properties such as a number of windings per slot, a geometry of the windings, etc. Calculations are also performed at 1102, based on the input image and input data. For example, the windings geometry may be converted into a number of pixels and minimum and maximum areas of the windings may be estimated.

At 1104, method 1100 includes outputting a binary mask based on the input image by obtaining copper estimates via thresholding. The thresholding may be a color-based boundary, or a color-based threshold, applied to the input image to infer which regions of the input image corresponds to copper (e.g., the conductors) to allow the binary mask to be generated. The binary mask depicts contrast between regions that are not attributable to copper, which may be assigned a value of zero, and regions that correspond to copper, which may be assigned a value of one.

As an example, an input image of a transverse section of stator, may be the first image 500 of FIG. 5. By processing the first image 500 as described above, a binary mask output 1200, as shown in FIG. 12, may be generated by the insulation prediction model. The binary mask output 1200 depicts copper regions 1202, corresponding to the plurality of conductors 502 of FIG. 5, in white and areas surrounding the copper regions 1202, where the surrounding areas are not formed of copper, in black. Generation of the binary mask therefore distinguishes between regions of different materials from an image, based on application of the thresholding, e.g., an assigned value for an image a parameter that is applied to the image.

For example, the thresholding may be set to a value representing a difference between red and green within the RGB color space in the processed image, such as 30. Any regions corresponding to a value greater than 30 may be displayed as white (indicating copper) in the binary mask while regions assigned values of 30 or less may be displayed as black in the binary mask. The thresholding may be decreased, causing the black regions to be converted to white as the threshold value decreases from 30. The white areas may be characterized based on number of pixels and area orientation as the threshold value is decreased. A resulting copper estimate may be used to determine if the thresholding value is suitable, e.g., based on training images. For example, if too few pixels, relative to a target number of pixels are attributed to copper in the copper estimate, the threshold value may be too high and if too many pixels, also relative to the target number of pixels, are attributed to copper in the copper estimate, the threshold value may be too low. The area orientation may be, as an example, within 20 degrees of a vertical axis of the stator.

The thresholding may be repeated a second time and a third time to obtain additional copper estimates. However, the second iteration of the thresholding may be set to a value representing a difference between red and blue and the third thresholding may be set to a value representing a threshold hue in the HSV color space. At 1106, method 1100 includes combining the copper estimates from the thresholdings and removing noise from a resulting combined copper estimate. The copper estimates may be combined by determining a running sum of the individual copper estimates and noise may be removed from the combined copper estimate by examining area properties. Determining the running sum may include assessing areas of the images based on pixel count (e.g., how many pixels are white which corresponds to copper) as well as orientation of the areas. As an example, if the pixel count is too low or too high relative to a known size of the respective conductor, then the pixel group may either not be copper or may be a poor estimate of copper.

For example, the running sum may be determined for each iteration of the thresholding as a sum generated while the threshold value is varied. Each threshold value may result in generation of a binary (black and white) image and the running sum may account for image variations due to non-uniform illumination, poor cross-sectioning, poor polishing, etc. By utilizing the running sum, an optimized result of the thresholding may be applied over all threshold values, which may mitigate spatial variations that may otherwise decrease an overall copper estimate provided by the binary image.

At 1108, method 1100 includes optionally re-analyzing the copper estimates and associated thresholding according to an error correction which may be triggered when a number of identified conductors does not match an expected number of conductors. In one example, the error correction may be a sequential process that includes, first re-analyzing the individual copper estimates (e.g., for each iteration), to determine which iteration included correct quantification of the number of conductors. If none of the estimations included correct quantification of the number of conductors, then identification of which of the expected conductors are missing in the estimations may be determined using hue-based thresholding to located the missing conductors according to expected positioning of the missing conductors. The positioning may be expected based on a geometry of the conductors. The hue-based threshold values may be adjusted based on adjacent detected conductors closest to the missing conductors.

If the hue-based thresholding does not successfully locate the missing conductors, then digital image cross-correlation (DICC) may be performed. In such instances, DICC may be used to track and measure how features or parts of a target object may vary between two images. For example, a most probable location of the missing conductors may be determined via DICC. A target sub-image of one of the identified conductors may be selected, cropped and correlated to a search area at which one of the missing conductors is expected to be found, on a pixel-by-pixel basis. A location of maximum correlation may be a predicted location of the missing conductor.

As an example, if an expected number of conductors is 8 and only 7 conductors are found in the copper estimates, DICC may be repeated for each of the 7 located conductors, using a different conductor of the 7 located conductors for the target sub-image, for each repetition. This may provide a closest match, with respect to the 7 located conductors, to the missing conductor to be used to find a location of the missing conductor.

At 1110, method 1100 includes removing errors related to the windings, such as extra-windings pixel errors and intra-windings pixel errors. For example, enamel masking may be used to mask out regions in the images corresponding to an enamel of the stator. The enamel masking may be extrapolated from masking of copper areas performed during generation of the binary mask and the enamel masking may be incorporated into the binary mask as shown in a first combined mask 1300 depicted in FIG. 13. Further, as shown in FIG. 13, a paper fill mask 1302, which may be generated at 706 of FIG. 7, is added to the first combined mask 1300. A resulting combined binary image 1304 may display voids 1306.

In addition, smoothing is applied to the images at the regions of the images corresponding to copper (e.g., windings) and/or the varnish at 1112 of FIG. 11. The smoothing may include removing observed voids sufficiently small to be deemed noise. The smoothing may also include mitigating occlusion of void detection arising from a presence of debris in the observed void regions by employing void correction. Void correction may include removing noise present in the combined binary image due to poor edge quality in the combined binary image may be removed. For example, a Savitzky-Golay filter may be applied to the voids to generate new boundaries around each of the voids, forming filtered masks for each of the voids. The filtered masks may be added to the combined binary image (e.g., the combined binary image 1304 of FIG. 13) generated at 1110 of FIG. 11 to produce a smoothed mask.

At 1114 of method 1100, the fill percentages of the varnish at each stator slot is determined and exported. For example, pixel areas may be summed in the smoothed mask for each of the images and converted to $mm^2$. Total void areas may be computed and the fill percentages determined based on the total void areas relative to the pixel areas.

In examples where images delivered to the automated tool, as depicted at 404 of FIG. 4, are images of axial sections of the stator (such as the second image 600 of FIG. 6), the second or the third technique for training the insulation prediction model of the automated tool may be used. The second technique may utilize k-means clustering to transform the images for color distribution analysis. The third technique may be a streamlined AI analysis that relies on image analysis in RGB color space, as well as generation of binary images with image parameter thresholds applied. As such, both techniques may leverage clustering analysis of the images to identify varnish.

Turning now to FIG. 14, an example of a method 1400 for training the insulation prediction model to estimate varnish fill percentage at stator slots according to the second technique is depicted. The method 1400 may be implemented at a processor, such as the processor 110 of FIG. 1. Prior to feeding the images (e.g., the images including at least fluorescence images) to the insulation prediction tool for training, the images may be processed via image processing algorithms of the automated tool, as described above with respect to 404 of FIG. 4. As such, method 1400 begins at 404 of method 400, after initial processing of the images is conducted. For example, the images may be cropped using deep learning algorithms, as described above, thereby cropping the images to edges, e.g., shoulders, of a depicted slot of one of the images. In other words, cut portions of stator may be removed from the images such that only the slot is displayed in each of the images.

Further, 1402 to 1406 of method 1400 may also be included in 404 of FIG. 4, when the insulation model is trained and the second technique is used to analyze the images. In other words, the images may be specifically processed according to 1402 to 1406 when the insulation model is trained according to the second technique to analyze images of the axial sections of the stator. At 1402 of method 1400, varnish in the images may be identified by applying k-means clustering to the images after transforming the processed images. For example, the images may be converted to HSV color space, as described above with reference to method 700 of FIG. 7, and HSV clusters may be identified in the converted images, e.g., similar to the clusters shown in FIG. 8. The HSV cluster may be converted to cluster-only images and mean color values may be determined in the cluster-only images to identify varnish. As an example, clusters in the cluster-only image may be plotted as color value relative to a transect along each cluster and a mean value of the respective cluster may be estimated. In order for the clusters to be correlated to varnish, the mean values may be larger than an experimentally determined color value. A blue portion of the clusters confirmed to be varnish may be input to image processing algorithms of the automated tool to generate masked images of the varnish clusters.

At 1404 of method 1400, the varnish cluster may be analyzed to obtain cluster data. For example, the varnish cluster distribution of blue values of the masked images may be determined and a shape, number, and position of peaks in the distribution analyzed. For example, a graph 1500 is shown in FIG. 15 plotting a distribution of blue values relative to a transect along an area of a varnish cluster. A shape of the distribution, a number of peaks, and a relative position of the peak(s) may be analyzed and determined based on image processing algorithms of the automated tool. At 1406, method 1400 includes inputting resulting data from the analysis to the insulation prediction model for processing. Processing of the data of the clusters may include converting data for each cluster to a value between 0 and 10.

At 1408, method 1400 includes applying a prediction index threshold to assess a quality of the analysis. Applying the prediction index threshold includes determining if the data for each cluster of a slot are assigned a value less than or equal to 2. For example, clusters assigned values less than or equal to 2 may correspond to data of sufficient quality to confirm that the clusters are varnish, e.g., the data provides results that match ground truth data to a threshold extent. If all analyzed clusters for a slot are confirmed to be varnish, method 1400 continues to 1410 to compare the results from method 1400 to results from method 1600. Details of how the results are compared are described further below, with reference to 1614 of FIG. 16.

If, however, at least one of the analyzed clusters for a slot is assigned a value of greater than 2, an alternate method for varnish identification may be demanded and, at 1412, method 1400 proceeds to a method 1600 depicted in FIG. 16. The method 1600 may utilize the third technique for training the insulation prediction model to identify and quantify varnish in fluorescence images of axial sections of the stator.

Method 1600 of FIG. 16 may also be implemented at a processor, e.g., the processor 110 of FIG. 1, and rely on image processing algorithms and streamlined AI algorithms, e.g., a smaller set of algorithms demanding less processing power than, for example, the AI algorithms of methods 700, 100, and/or 1400, for execution. The images may be the processed images (e.g., cropped and filtered) used in method 1400 of FIG. 14. At 1602, method 1600 includes determining a threshold to be applied to the processed images. By applying the threshold, e.g., a threshold level of an image parameter, varnish may be identified in the images. For method 1600, 1604 and 1606 represent additional processing steps applied to the processed images to prepare the processed images for delivery to the insulation prediction model at 1608.

For example, determining the threshold may include generating differential images at 1604. The differential images may be obtained by converting images of the axial sections of the stator to RGB color space to determine the threshold as a difference between red and green color spaces. The threshold may define a boundary enabling identification of varnish in the differential images. The differential images may be analyzed, at 1606, via color distribution analysis according to a blue portion of the images. Analysis of the blue portion of the images may include plotting the differential images according to parameters shown in FIGS. 17A-17E. For example, FIG. 17A shows a first plot 1700 of mean cluster blue values for one of the differential images, FIG. 17B shows a second plot 1702 of a blue values histogram of the differential image, FIG. 17C shows a third plot 1704 of a gray histogram of the differential image, FIG. 17D shows a fourth plot 1706 of a histogram of only blue-hue values in HSV color space, and FIG. 17E shows a fifth plot 1708 of mean cluster blue in HSV color space. The plots depicted in FIGS. 17A-17E may be generated using image processing algorithms of the automated tool.

At 1608, determining the threshold may further include inputting data from the cluster-only image, the data corresponding to the analysis results of 1606 to the insulation prediction model. In one example, the insulation prediction model may be configured with AI algorithms for performing random forests protocols, where random forests is an ensemble learning method for performing tasks by constructing decision trees during training. The tasks may include classification and regression, for example. The insulation prediction model may, at 1610 of method 1600, output a threshold for a contrast between red and green for the differential images. The threshold may define a pixel color boundary that differentiates between pixels corresponding to varnish and pixels not corresponding to varnish. The threshold may be a value between 0 and 20.

At 1612, method 1600 further processing of the differential images, using image processing algorithms, by applying the threshold to the differential images to generate thresholded binary images. An example of a differential image 1800 is illustrated in FIG. 18A, where the differential image 1800 is converted to RGB color space to show a difference between red and green. A thresholded binary image 1820, created by applying a threshold determined by the insulation prediction model to the differential image 1800, is shown in FIG. 18B. Pixels remaining from the differential image 1800 that are depicted in the thresholded binary image 1820 may be pixels with threshold group values less than the threshold output by the insulation prediction model. The remaining pixels may correspond to varnish.

At 1614, method 1600 includes, comparing the results of the third technique (e.g., as described with respect to method 1600) to the results of the second technique (e.g., as described with respect to method 1400 of FIG. 4). For example, varnish identification from the thresholded binary images of method 1600 may be compared to varnish identification from the cluster-only images of method 1400. As one example, a total area of blobs (e.g., groups of pixels with at least one shared property) for each of a cluster-only image and a thresholded binary image for a common slot of the stator may be quantified. An extent of the respective blob areas may be computed, where the extent is defined as a fill percentage of a blob area. An average extent of the blobs for each type of image may be estimated and a number of individual blobs for the cluster-only image may be compared to a number of individual blobs for the thresholded binary image. Furthermore, a value of a varnish quality index may be referenced to determine a resulting quality of the thresholded binary image or if an alternate process may be more suitable for estimating the varnish fill percentage.

For each of the images, any blob with less than 400 pixels may be removed and a change in the respective image, relative to the image before removing the pixels, may be compared between the two image types. The AI methodology associated with the image, e.g., the cluster-only image or the thresholded binary image, that exhibits a least amount of change, as well as least overall area change, may be selected for continued evaluation and training. The continued evaluation may include comparing the extent of the selected image to an absolute value representing a difference in extent between the cluster-only image and the thresholded binary image to determine which methodology provides a more accurate image, with respect to the varnish quality index. In other words, the continued evaluation determines which methodology provides a better prediction of varnish condition.

A representative image that demonstrates a least amount of noise from the selected image type, e.g., from the cluster-only images of the slots or the thresholded binary images of the slots, may be used for further processing according to method 1600. For example, noise in the images may be identified by changing the thresholding of images and/or increasing a blob size filter (e.g., varying the filter from 400 pixels), and observing how much image area disappears. The greater the noise in an image, the greater an area that may disappear under binary filtering to remove noise.

The further processing includes, at 1616, identifying twist and crown portions in the processed image, e.g., a portion of the processed image corresponding to a twist end of the stator and a portion of the training image corresponding to a crown end of the stator, where the processed image is one of the images of the axial sections corresponding to the representative image, after cropping and filtering the image and prior to generating the differential images.

The twist and crown portions may be identified by referring to the label applied to the images during processing, as described above with reference to 404 of FIG. 4. For example, the processed image may include a label indicating the twist end of the slot which may be recognized by the image processing algorithms of the automated tool. An x-value of a centroid of the label indicating the twist end may be identified and applied to the representative image (e.g., a thresholded binary image or a cluster-only image). The centroid may be used to split the representative image into the two portions, with the portions identified as either the twist end or the crown end based on the label in the original image.

For each of the portions, a number of pixels corresponding to varnish (e.g., varnish pixels) may be summed and divided by a total number of varnish pixels and non-varnish pixels to obtain fill percentages of varnish corresponding to the twist end and the crown end of the slot. A fill percentage for the slot may be inferred by summing a total number of varnish pixels in the representative image and dividing the total number of varnish pixels by a total number of both varnish and non-varnish pixels in the representative binary image. At 1618, method 1600 includes outputting the fill percentages from the automated tool in a suitable format for display.

Images of axial sections of a stator may therefore be evaluated according to the second technique or the third technique during training of the insulation prediction model. During training, if the results of the second technique consistently do not provide unanimous threshold values less than or equal to 2 for all clusters of a slot, the third technique may be chosen as a more suitable technique for the insulation prediction model. In other examples, where the second technique does provide threshold values less than or equal 2 for all clusters, the fill percentages provided by the second technique and the fill percentages provided by the third technique for a common slot may be compared to identify which technique provides higher accuracy.

Furthermore, an accuracy of results from analysis of images of transverse sections of a stator may be compared to an accuracy of results from analysis of images of axial sections of a stator. Processing and analysis for an image type with greater accuracy may be chosen for subsequent assessment of stator varnish. However, if the results of the image types provide similar accuracies, evaluation based on the axial section images may be preferentially selected due to a lower processing demand associated with processing and analysis of the axial section images compared to the transverse section images.

The training of the AI model, by any of the three techniques described previously and shown in FIGS. 7, 11, 14, and 16, may be leveraged to analyze images of an intact stator. In other words, the AI model may be trained based on images of axial and/or transverse sections of a stator that is cut accordingly, and the trained AI model may be subsequently used to evaluate varnish condition in images of the intact stator. In order to irradiate an inner surface of the stator (e.g., the intact stator) in a reproducible manner, an imaging system may be used that includes an enclosure for housing the stator and devices for illuminating and collecting images of the inner surface within the enclosure. An example of an imaging system 1900 for acquiring images of a stator is illustrated in FIG. 19. It will be noted that the same set of reference axes 201 of FIGS. 2-3B is used in FIG. 19.

As shown in FIG. 19, the system 1900 includes an enclosure 1902, e.g., a housing, shaped as a rectangular box. The enclosure 1902 is hereafter referred to as a light box 1902. The light box 1902 is depicted with a front panel removed for clarity. During irradiation and image acquisition, however, the front panel may be coupled to panels of the light box 1902 visible in FIG. 19 to provide a closed system. It will be appreciated that the light box 1902 is presented as a non-limiting example of a system for obtaining fluorescence images of an imaging subject. Variations in a configuration of the system have been contemplated, as described further below.

In the example of FIG. 19, an interior of the light box 1902 may include a clamp 1903 for supporting a stator 1904. The stator 1904, may be configured with slots along its inner surface, similar to the stator 200 of FIGS. 2A-3B, with varnish-coated windings wound through the slots. In one example, as shown in FIG. 19, a top panel 1906 of the light box 1902 may include an opening through which a UV light assembly 1908 may be inserted. However, other configurations for positioning the UV light assembly 1908, and maintaining a position thereof, are possible without departing from the scope of the present disclosure. For example, a remote mounted camera in combination with a bounce mirror positioned within the stator 1904 may be used in another example.

The UV light assembly 1908 is illustrated in greater detail from a first view 2000 in FIG. 20A and a second view 2050 in FIG. 20B. A set of reference axes 2001 are provided for comparison between the first view 2000 and the second view 2050, indicating an x-axis, a y-axis, and a z-axis. The UV light assembly 1908 includes a stem 2002 which may extend through the opening in the top panel 1906 of the light box 1902, as shown in FIG. 19, and protrudes outside of the light box 1902, along the z-axis. For example, a portion 2004 of the stem 2002, below a gasket 2006 along the z-axis, may be inside of, e.g., interior to, the light box 1902. A support plate 2010 may be coupled to the stem 2002 to support a UV light source 2012, as shown in FIG. 20A. The support plate 2010 may include an aperture 2014, as shown in FIG. 20B, aligned with a lens of the UV light source 2012 which may be configured to direct UV light therethrough. As such, a beam of UV light may be emitted through the aperture 2014.

The support plate 2010 may also support detectors 2016, as depicted with greater detail in FIG. 6, for detecting fluorescence of an object or surface that the beam of UV light strikes. In some instances, at least one of the detectors 2016 may be configured for detecting fluorescence and at least one of the detectors 2016 may be configured as a camera for capturing images (e.g., photographs) according to the visible light spectrum. The detectors 2016 may therefore be inserted within an inner passage of the stator 1904, as illustrated in FIG. 19, to induce fluorescence at varnish located within slots of the stator 1904 and collect at least fluorescence images. However, in other examples, the detectors 2016 may be arranged external to the stator 1904 and fluorescence at the stator may be directed to the detectors 2016 using mirrors.

In one example, the UV light assembly 1908 may be rotated about the z-axis to capture images of sections of the inner surface until imaging of a cumulative 360° field of view (FOV) is acquired. A number of images may depend on the FOV of the detectors 2016. Furthermore, a UV light assembly with a compact light source, variable intensity and wavelength, and high-resolution with short focal length may be demanded due to a proximity of the UV light assembly to the stator inner surface during image capture. In addition, optimization of an incident wavelength emitted by the UV light source may be desired for each specimen due to variations in varnish composition as well as to compensate for lighting effects, such as washing out of images.

As noted above, the UV light assembly shown in FIGS. 19-20B is a non-limiting example of how a light assembly for acquiring images of a stator may be arranged. Variations in orientation of the light assembly components, inclusion of additional or alternative components, routing of electrical cables and connectors, mounting and/or securing of components, etc., are possible in order to align a target imaging area of the stator with the FOV of the detectors. Additionally, the detectors may be communicatively coupled to a processor used to process images acquired by the detectors. For example, the detectors may be coupled to the processor via wireless communication protocols or a hard-wired connection.

Images acquired by an imaging system, such as the imaging system 1900 of FIG. 19, may be processed to transform the images according to a color distribution of the images, thereby allowing varnish to be identified and quantified in the images. Color distribution analysis may be performed according to image processing algorithms of an automated tool implemented at a processor, such as the processor 110 of FIG. 1, and visual representations of a condition of a vanish coating at slots of the stator may be output from an insulation prediction model of the automated tool. The visual representations may include estimated varnish fill percentages and/or 2D representations of varnish distribution.

An example of a method 2100 for predicting varnish condition at slots of a stator based on images of an inner surface of the stator, and presenting the varnish condition in a 2D representation, is depicted in FIG. 21. Method 2100 may be implemented at the processor, the processor able to retrieve data from a database such as the database 112 of FIG. 1, and configured with image processing and AI algorithms that include machine learning and deep learning algorithms. The insulation prediction model may be trained according to one or more of the techniques of FIGS. 11, 14, and 16 to analyze the processed images of an inner surface of a stator. The stator may be a stator with a slotted inner surface, as shown in FIGS. 2A-3B, with windings wound through slots of the stator.

At 2102, method 2100 includes illuminating an inner surface of the stator to obtain images of the inner surface. For example, the stator may be placed in a light box, such as the light box 1902 of FIG. 19, and irradiated with UV light. In some examples, the stator may also be illuminated with visible light to collect light images (e.g., photographs). Further, the images, including at least fluorescence images and, optionally, photographs, may be acquired at 2102 using detectors such as the detectors 2016 of FIGS. 20A-20B. The detectors may have FOVs that at least overlap by a predetermined extent. In one example, the FOVs of the detectors may be aligned.

For image acquisition, imaging conditions may be optimized by, for example, setting a focus of the detectors, which may demand adjustment of a position of the UV light assembly relative to the stator or adjustment of a position of the stator relative to the UV light assembly to adjustment a distance between a light source and the stator inner surface, adjusting an angle of incident light at the stator inner surface, etc. As described above, light emitted by the light source may be tuned to a suitable wavelength for inducing fluorescence of the varnish.

At 2104, method 2100 includes processing the acquired images. Processing the acquired images may include applying parameter adjustments intrinsic to the detectors (e.g., cameras) at 2106. The camera parameters may be preset options enabled by, for example, microprocessors of the detectors for adjusting an appearance and display of the images. As an example, the detector configured to acquired photographs may include a capability for removing skew and a "fish-eye lens" effect from the acquired photographs. The model may include instruction for automatically detecting and adjusting skew and/or the "fish-eye lens" effect when the photographs are obtained. For example, the detectors may be communicatively coupled to the processor at which the model is implemented. Alternatively or additionally, the camera parameters may be adjusted by a user, e.g., using camera software and/or image processing algorithms, to achieve a desired effect in the photographs. Furthermore, in some instances, instructions for modification of the images based on the intrinsic parameter adjustments of the detectors may be input and received by the detectors before or during image acquisition at 2102. In other examples, the parameter adjustments may be applied after the images are acquired and retrieved, e.g., from a transient/non-transient memory of the processor or a database, for processing.

Processing the acquired images may also include separating each of the acquired images, e.g., the fluorescence images and, optionally, the photographs, into segments, assigning identifications of the segments according to which slot of the stator is represented in the segments, and adjusting orientations of the segments at 2108. For example, the acquired images may be divided into segments according to identification of slots from the photographs of the acquired images. In other words, each segment of a photograph may correspond to a slot of the stator and a correlated fluorescence image may be similarly segmented such that each segment of the fluorescence image also corresponds to a slot of the stator. An angle of each segment may be adjusted to align the slot with a vertical or longitudinal axis of the slot. Segmentation and alignment correction of the acquired images may be performed using image processing algorithms stored at a memory of the processor.

At 2110, processing the acquired images may also include rescaling the segments. For example, the image segments may be processed via a programming language, such as MATLAB, and a scale of the segments adjusted to a target segment size using built-in algorithms for resizing images, such as IMRESIZE. As such, each the slots may be depicted in the image segments at a consistent scale. In addition, processing the acquired images may include outputting a one-dimensional (1D) slot profile, such as a 1×N profile, or a 6×N to 12×N representation from the photograph segments at 2112. For example, a line may be drawn longitudinally (e.g., aligned with the vertical axis) through a center of the slot in the photograph segments and the line may be similarly applied to a corresponding fluorescence image segment by aligning the fluorescence image segment with the photograph segment. Slot profiles may thereby be obtained from the fluorescence image segments. The generation of the slot profiles from the fluorescence image segments may be performed using color distribution analysis of the fluorescence image segments, as described above with respect to the techniques elaborated in FIGS. 7, 11, 14, and 16.

At 2114, method 2100 includes inputting the processed images, e.g., at least the fluorescence image segments, to the insulation prediction model. The insulation prediction model may be configured with image processing algorithms, such as k-means clustering, and/or deep learning algorithms to manipulate and analyze the processed images, as described above, with reference to FIGS. 7, 11, 14, and 16. Further, the insulation prediction model may be trained via one or more of the training techniques of FIGS. 11, 14, and 16. Inputting the processed images to the insulation prediction model may therefore, optionally, include estimating varnish fill percentages of each imaged stator slot at 2116 of method 2100.

Additionally, inputting the processed image to the insulation prediction model may prompt the insulation prediction model to form image pairs based on the processed images at 2118. Forming the image pairs may include matching each fluorescence image segment with a corresponding ground truth image. The ground truth images, may be created via image processing algorithms and/or deep learning algorithms, as described above with reference to FIGS. 11, 14, and 16, or by another type of methodology. In other words, the insulation prediction model may be trained via one or more of the techniques described previously to generate the ground truth images upon delivery of the processed images to the insulation prediction model.

Figure 24:
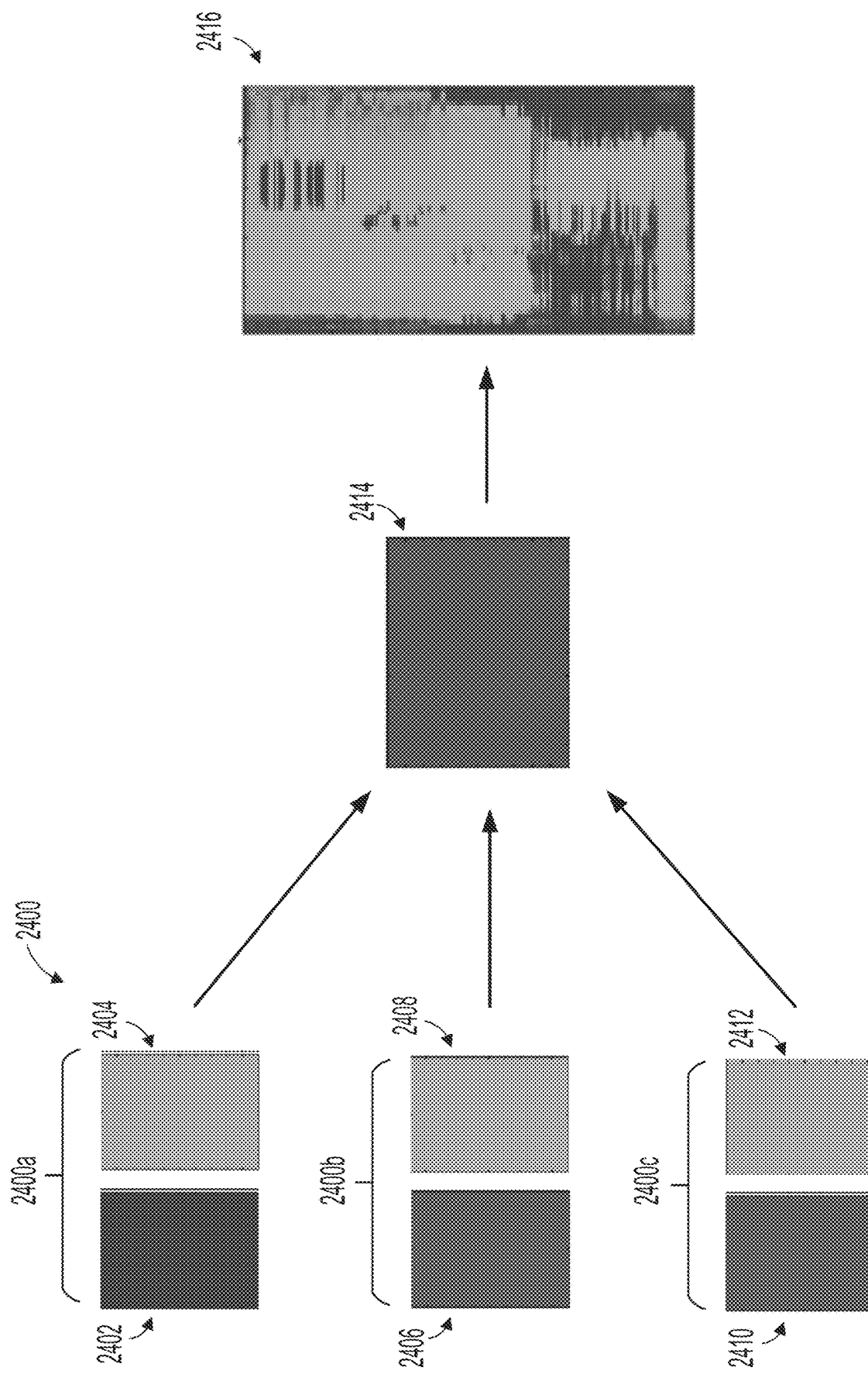
FIG. 24 shows an example of deconstruction of one of the image column/slot profile pairs of FIG. 23 into pixel pairs.

The insulation prediction model may also be trained, based on the training techniques of FIGS. 11, 14, and 16, to output 2D representations of the imaged slots in addition to, or in place of numerical fill percentages estimated at 2116. As such, at 2120, method 2100 includes creating the 2D representations, details of which are described below with respect to FIG. 22, and outputting the 2D representations from the insulation prediction model. The 2D representations output from the insulation prediction model are displayed at a display device at 2122. An example of the displayed 2D representation is depicted in FIG. 24, and described further below.

Figure 23:
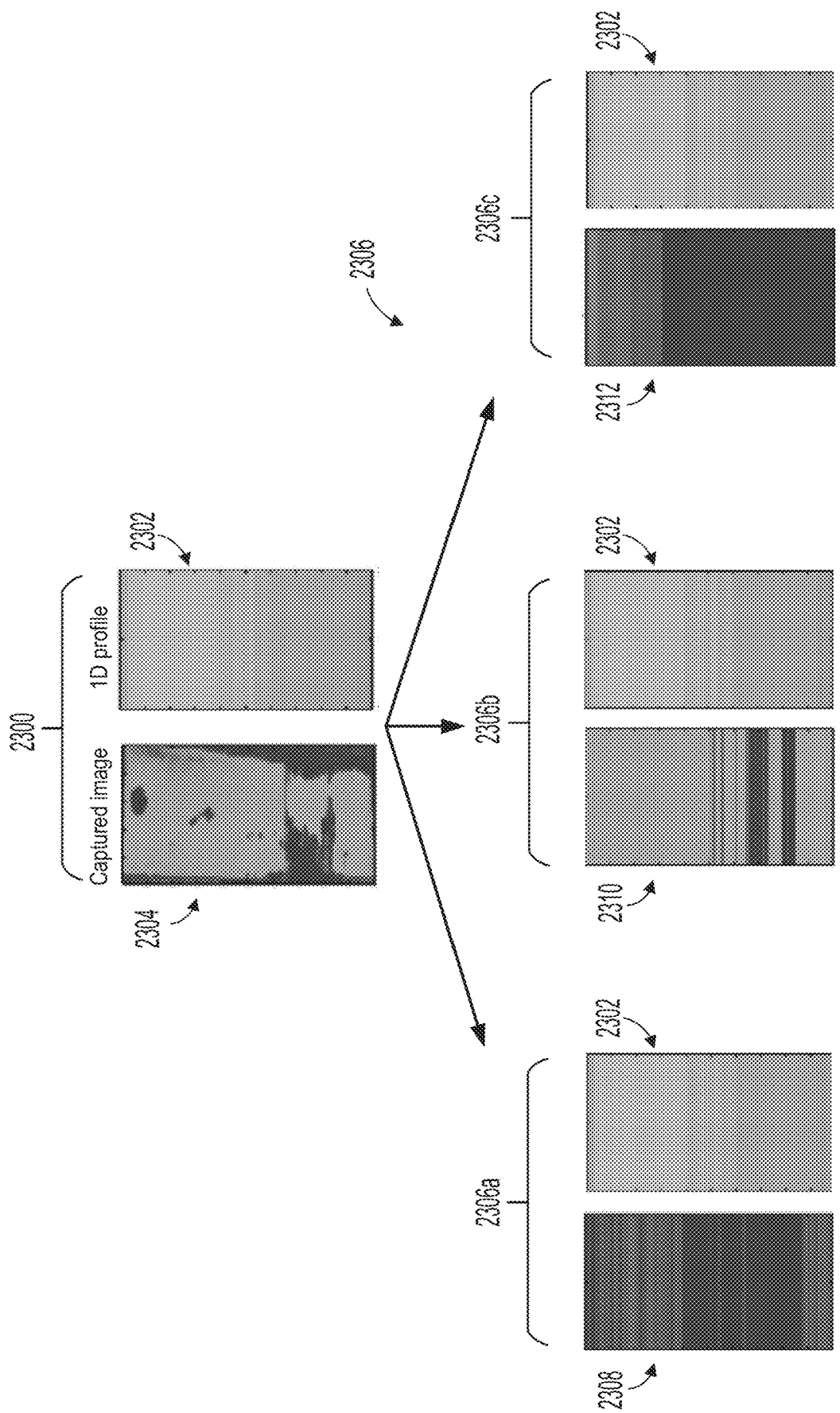
FIG. 23 shows an example of deconstruction of an image/slot profile pair into image column/slot profile pairs which may be performed by the machine learning model of FIG. 22.

Turning now to FIG. 22, method 2200 depicts a process for generating the 2D representation of the processed images, as described at 2114 of FIG. 21. At 2202, method 2200 includes deconstructing images, e.g., input images, to generate slot profile/image column pairs. For example, as shown in FIG. 23, a 1D slot profile 2302, as described at 2112 of FIG. 21, may be paired with an original, captured image 2304 (e.g., the input image) from which the 1D slot profile was generated, to form an image pair 2300. The image pair 2300 may be sent to a training tool (e.g., image processing and deep learning algorithms for training) of the insulation prediction model to be deconstructed into a plurality of slot profile/image column pairs 2306.

The captured image 2304 may be sliced into columns to form the plurality of slot profile/image column pairs 2306 by resizing the captured image 2304 to X by Y (e.g., along an x-axis and a y-axis, respectively of the captured image 2304). A value of X may represent a distance along a radius of the stator, from an inner diameter of the stator to an outer diameter of the stator, as indicated by arrow 2301 in FIG. 3A, where a direction indicated by arrow 2301 is from the inner diameter to the outer diameter. In other words, the value of X may represent a width of a slot of the stator. A value of Y may represent a distance along a central axis of rotation of the stator, as indicated by arrow 2303 in FIG. 3A. In other words, the value of Y may represent a length of the slot of the stator. Each pixel of the resized image represents one point of the image, which may be one of the columns. As an example, if a captured image is resized to X=50 by Y=200, 50 columns may be formed from the captured image. The value of X therefore determines a number of columns generated from the captured image. For each column, a height of the column is equal to the value of Y. For example, as shown in FIG. 2300, a first slot profile/image column pair 2306a, comprising a first image column 2308 and the 1D slot profile 2302, a second slot profile/image column pair 2306b, comprising a second image column 2310 and the 1D slot profile 2302, and a third slot profile/image column pair 2306c, comprising a third image column 2312 and the 1D slot profile 2302, may be obtained from the image pair 2300. Each image column is a slice of the captured image 2304 and the 1D slot profile 2302 is a representative profile constructed from one or more ground truth images stored in the database.

Each of the plurality of slot profile/image column pairs 2306 may be further deconstructed into individual pixels by the insulation prediction model at 2204 of method 2200. In other words, the segments of the original, captured image may be deconstructed on a pixel-scale resolution for analysis by the insulation prediction model. For example, the second slot profile/image column pair 2306b of FIG. 23 may be broken down into a plurality of pixel pairs 2400 depicted in FIG. 24. For example, a first pixel pair 2400a may be formed of a first pixel 2402 from the second image column 2310 of FIG. 23, and a corresponding first pixel 2404 from the 1D slot profile 2302 of FIG. 23, a second pixel pair 2400b may be formed of a second pixel 2406 from the second image column 2310 and a corresponding second pixel 2408 from the 1D slot profile 2302, and a third pixel pair 2400c may be formed of a third pixel 2410 from the second image column 2310 and a corresponding third pixel 2412 from the 1D slot profile 2302.

At 2206, method 2200 includes examining the plurality of pixel pairs, e.g., by the training tool of the insulation prediction model, where the training tool includes one or more algorithms for minimizing loss by examining captured image/ground truth image pairs. For example, returning to FIG. 24, an individual algorithm may be generated based on the plurality of pixel pairs 2400 associated with the second slot profile/image column pair 2306b of FIG. 23, allowing the insulation prediction model to output a predicted pixel 2414 (as shown in FIG. 24) for each pixel location. The insulation prediction model may thereby be updated based on a determined loss between the pixels of each of the plurality of pixel pairs 2400. Method 2200, at 2208, includes using the training tool to update/train the insulation prediction model to learn relationships between the pixels of the plurality of pixel pairs, and applying known relationships (based on previous input pixel pairs) to the plurality of pixel pairs.

At 2210, method 2200 includes assembling the predicted pixels from the 1D slot profiles to recreate the captured image as a predicted slot image 2416, as illustrated in FIG. 21. The assembling may be performed based on the learned/applied relationships of 2208. The predicted slot image 2416 may be a 2D plot of fluorescence intensity that mimics the original, captured image 2304 of FIG. 23. As such, a color distribution of the predicted slot image 2416 may indicate regions of varnish. For example, green/yellow regions may correspond to varnish while dark blue regions (e.g., regions lacking yellow hues) indicate an absence of varnish. Method 2200 returns to FIG. 21 to display the 2D plot (e.g., as one of the 2D representations) at 2122 of method 2100, as described above.

In this way, a condition of a varnish coating windings of a stator may be evaluated in a non-destructive, efficient manner. By tuning UV irradiation of an inner surface of the stator to wavelengths of light that induce fluorescence from the varnish, fluorescence and visible light images of an inner surface of the stator may be obtained and used to identify slots of the stator in which the varnish is disposed. The images may be segmented according to identification of the slots and regions corresponding to the varnish to be readily located by a model trained via machine learning. The model may be trained to recognize the varnish regions and generate an estimate of a fill percentage of the varnish at each of the stator slots based on analysis of a fluorescence signature in the fluorescence images. The fill percentage may be presented to a user as a comprehensive report, providing numerical estimates of fill percentage for each slot of the stator. In some examples, the numerical estimates may include an overall fill percentage for a respective slot, as well as a fill percentage for a first portion of the slot, e.g., a twist end, and a fill percentage for a second end of the slot, e.g., a crown end.

The model may also be trained to output a 2D representation of a fluorescence signature of a slot. Thus, a visual representation of the model's output may include a series of 2D representations, each representation corresponding to a slot of the stator. By segmenting the fluorescence images of the inner surface of the stator into the individual slots and recreating variations in fluorescence at high resolution for each of the slots, the user may view a detailed distribution of varnish at the slots. Trends and tendencies with respect to regions and/or slots prone to high varnish deposition versus low varnish deposition may be readily observed, allowing subsequent adjustment to a varnish application procedure. As such, the 2D representation provides high resolution information regarding varnish distribution which may be provided in place of or in addition to the estimated fill percentages. Without segmenting the captured fluorescence images and generating predicted fluorescence profiles of the slots, the trends and tendencies for varnish deposition may not be discerned by the user during visual examination of the captured fluorescence images.

The model may be continuously updated as a database of images grows and accumulates additional images, thereby increasing a prediction accuracy of the model. By leveraging machine learning to estimate varnish fill percentage, evaluation of the varnish condition may be automated, rapid, and reproducible, allowing the fill percentage and/or the 2D representations to be determined within minutes rather than hours. Furthermore, minimal manual labor is demanded, in contrast to conventional methods of evaluation involving slicing of sacrificial stators for visual inspection.

Efficient evaluation of the varnish coating may also allow fine tuning and optimization of the incident wavelength used to illuminate the varnish coating and induce fluorescence to be conducted rapidly. Production of stators with non-conforming varnish coatings is therefore minimized. As well, by providing the predicted fill percentage in real-time via the model, accumulation of manufactured stators maintained in a holding period between production and varnish coating evaluation may be reduced. For example, when conventional, destructive analysis of stators is utilized, manufacturing of the stators may outpace quality control procedures, leading to storage of completed stators awaiting assessment and leading to a back-log. Alternatively, production may be stalled until the conventional analysis is completed for a batch of manufactured stators, resulting in lower production output. By determining the varnish distribution as described herein, production output is not hindered by evaluation of the varnish coating.

A technical effect of applying AI to predict a fill percentage of varnish at slots of a stator, based on fluorescence images of the slots, is that an estimation of a condition of the varnish is generated via non-invasive processing methods and presented to a user as a comprehensive visual representation that identifies a distribution of the varnish across each of the slots. For example, the fluorescence images may be pre-processed using deep learning to crop and modify the images to minimize a presence of image pixels not attributable to varnish and to align the images to allow the images to be converted and transformed for analysis. The converted and transformed images may be rapidly analyzed for varnish presence and fill extent using AI algorithms. Predictions provided by the AI-based model may become increasingly accurate over time as a dataset for the model increases.

The disclosure also provides support for a method for automatically analyzing images of a stator, comprising: receiving the images of the stator at an automated tool implemented at a processor of a computing system, the images depicting slots in an inner surface of the stator, processing the images using image processing and deep learning algorithms by segmenting and aligning the images to generate processed images, inputting the processed images to an artificial intelligence (AI) model of the automated tool, the AI model trained to identify varnish in the processed images based on color distribution analysis, generating predicted two-dimensional (2D) representations of varnish distribution for the slots via the AI model, and displaying the 2D representations at a display device. In a first example of the method, receiving the images of the stator includes acquiring the images using a housing enclosing a UV light assembly configured to illuminate the inner surface of the stator and induce fluorescence at varnish in the slots of the stator. In a second example of the method, optionally including the first example, segmenting the images includes dividing the images into segments, each segment of the segments corresponding to a slot of the slots, and wherein the slots are identified in the images based on comparison of the images to photographs of the inner surface of the stator. In a third example of the method, optionally including one or both of the first and second examples, aligning the images includes aligning the segments with a longitudinal axis of the slot in the photographs. In a fourth example of the method, optionally including one or more or each of the first through third examples, processing the images further comprises rescaling the segments by adjusting a size of each of the segments according to a consistent scale and generating a one-dimensional (1D) slot profile for each of the segments. In a fifth example of the method, optionally including one or more or each of the first through fourth examples, training the AI model to identify the varnish includes training the AI model using one or more of converting the processed images to red green blue (RGB) color space, applying k-means clustering and analysis of cluster-only images, generating a differential image from the processed images based on contrast between colors, applying a color-based threshold to the processed images, generating binary masks from the processed images, and locating and quantifying voids in the processed images. In a sixth example of the method, optionally including one or more or each of the first through fifth examples, generating the predicted 2D representations includes matching segments of the processed images to ground truth images to form image pairs, each of the image pairs comprising a 1D slot profile and a corresponding ground truth image. In a seventh example of the method, optionally including one or more or each of the first through sixth examples, generating the 2D representations further comprises forming pixel pairs by deconstructing the 1D slot profile into individual pixels and matching each of the individual pixels to a pixel of the corresponding ground truth image. In a eighth example of the method, optionally including one or more or each of the first through seventh examples, generating the 2D representations includes reconstructing the segments of the processed images using pixels of the ground truth images, and wherein the 2D representations depicts fluorescence along a width of a slot of the slots, the width being perpendicular to a central axis of rotation of the stator, relative to a length of the slot, the length being parallel with the central axis of rotation. In a ninth example of the method, optionally including one or more or each of the first through eighth examples, the method further comprises: outputting estimated varnish fill percentages for the slots from the AI model and displaying the estimated varnish fill percentages in addition to the 2D representations.

The disclosure also provides support for a method of evaluating a varnish condition of a stator, comprising: illuminating an inner surface of the stator using a UV light source, the inner surface including slots, obtaining a fluorescence image of the inner surface via digital imaging equipment and transmitting the fluorescence image to a processor, segmenting the fluorescence image into slot profiles, using image processing algorithms implemented at the processor, by aligning the fluorescence image with a photograph of the inner surface of the stator and dividing the fluorescence image into segments, each segment corresponding to a slot of the slots, constructing a fluorescence signature for the slot, via a machine learning model implemented at the processor, by deconstructing a segment corresponding to the slot at a pixel-scale resolution and matching pixels of the segment to pixels of ground truth images, outputting a two-dimensional (2D) representation of the fluorescence signature of the slot from the machine learning model, and displaying the 2D representation at a display device. In a first example of the method, the fluorescence image is obtained without cutting the stator, and wherein the stator remains intact after the 2D representation is displayed. In a second example of the method, optionally including the first example, the method further comprises: resizing the fluorescence image prior to segmenting the fluorescence image, and wherein resizing the fluorescence image includes adjusting a scale of the fluorescence image to a first value representing a width of a corresponding slot of the slots, and to a second value representing a length of the corresponding slot. In a third example of the method, optionally including one or both of the first and second examples, segmenting the fluorescence image includes slicing the fluorescence image into a number of the slot profiles equal to the first value. In a fourth example of the method, optionally including one or more or each of the first through third examples, deconstructing the segment includes comparing the pixels of the segment to the pixels of the ground truth images and minimizing loss between the pixels of the segment and the pixels of the ground truth images. In a fifth example of the method, optionally including one or more or each of the first through fourth examples, minimizing loss includes generating an algorithm based on pixel pairs generated by the matching of the pixels of the segment to the pixels of the ground truth images to determine loss between the pixel pairs and updating the machine learning model. In a sixth example of the method, optionally including one or more or each of the first through fifth examples, outputting the 2D representation includes outputting predicted pixels corresponding to the pixel pairs and assembling the predicted pixels into a reconstruction of the segment.

The disclosure also provides support for a system for evaluating a varnish condition of a stator, comprising: a housing enclosing a UV light source and digital imaging equipment, and a processor configured with executable instructions stored in non-transitory memory that, when executed, cause the processor to: receive images of an inner surface of the stator from the digital imaging equipment, process the images using deep learning algorithms by segmenting and aligning the images to generate segmented images, input the segmented images to a machine learning model trained to identify varnish in the segmented images based on color distribution analysis, deconstruct the images at a pixel-scale resolution to construct predicted images from the segmented images, and display the predicted images, each of the predicted images corresponding to a slot of the stator, at a display device. In a first example of the system prior to segmenting and aligning the images, the images are modified by applying image parameter adjustments intrinsic to the digital imaging equipment, and wherein the image parameter adjustments includes removing skew and a fish-eye lens effect from the images. In a second example of the system, optionally including the first example, each of the predicted images show a fluorescence signature of the slot indicating regions corresponding to varnish based on a color distribution of the predicted images.

FIGS. 2A-3B and 19-20B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2A-3B and 19-20B are shown approximately to scale.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of evaluating a varnish condition of a stator, comprising:
    illuminating an inner surface of the stator using a UV light source, the inner surface including slots;
    obtaining a fluorescence image of the inner surface via digital imaging equipment and transmitting the fluorescence image to a processor;
    segmenting the fluorescence image into slot profiles, using image processing algorithms implemented at the processor, by aligning the fluorescence image with a photograph of the inner surface of the stator and dividing the fluorescence image into segments, each segment corresponding to a slot of the slots;
    constructing a fluorescence signature for the slot, via a machine learning model implemented at the processor, by deconstructing a segment corresponding to the slot at a pixel-scale resolution and matching pixels of the segment to pixels of ground truth images;
    outputting a two-dimensional (2D) representation of the fluorescence signature of the slot from the machine learning model; and
    displaying the 2D representation at a display device.

2. The method of claim 1, wherein the fluorescence image is obtained without cutting the stator, and wherein the stator remains intact after the 2D representation is displayed.

3. The method of claim 1, wherein further comprising resizing the fluorescence image prior to segmenting the fluorescence image, and wherein resizing the fluorescence image includes adjusting a scale of the fluorescence image to a first value representing a width of a corresponding slot of the slots, and to a second value representing a length of the corresponding slot.

4. The method of claim 3, wherein segmenting the fluorescence image includes slicing the fluorescence image into a number of the slot profiles equal to the first value.

5. The method of claim 1, wherein deconstructing the segment includes comparing the pixels of the segment to the pixels of the ground truth images and minimizing loss between the pixels of the segment and the pixels of the ground truth images.

6. The method of claim 5, wherein minimizing loss includes generating an algorithm based on pixel pairs generated by the matching of the pixels of the segment to the pixels of the ground truth images to determine loss between the pixel pairs and updating the machine learning model.

7. The method of claim 6, wherein outputting the 2D representation includes outputting predicted pixels corresponding to the pixel pairs and assembling the predicted pixels into a reconstruction of the segment.

8. A system for evaluating a varnish condition of a stator, comprising:
    a housing enclosing a UV light source and digital imaging equipment; and
    a processor configured with executable instructions stored in non-transitory memory that, when executed, cause the processor to:
    receive images of an inner surface of the stator from the digital imaging equipment;
    process the images using deep learning algorithms by segmenting and aligning the images to generate segmented images;
    input the segmented images to a machine learning model trained to identify varnish in the segmented images based on color distribution analysis;
    deconstruct the images at a pixel-scale resolution to construct predicted images from the segmented images; and
    display the predicted images, each of the predicted images corresponding to a slot of the stator, at a display device.

9. The system of claim 8, wherein, prior to segmenting and aligning the images, the images are modified by applying image parameter adjustments intrinsic to the digital imaging equipment, and wherein the image parameter adjustments includes removing skew and a fish-eye lens effect from the images.

10. The system of claim 8, wherein each of the predicted images show a fluorescence signature of the slot indicating regions corresponding to varnish based on a color distribution of the predicted images.

* * * * *